United States Patent
Marsh et al.

[15] 3,643,063
[45] Feb. 15, 1972

[54] ELECTRICAL DATA LOGGING SYSTEM FOR UTILITY INDUSTRY

[72] Inventors: Norman F. Marsh; Karl W. Struck, both of Springfield, Ill.

[73] Assignee: Sangamo Electric Company, Springfield, Ill.

[22] Filed: Dec. 4, 1969

[21] Appl. No.: 882,095

[52] U.S. Cl. .......................... 235/61.1, 234/112, 235/61.9, 340/15.5
[51] Int. Cl. ................... G01v 1/32, G06k 1/12, G06k 1/02, B06b 1/04
[58] Field of Search ........................... 340/15.5, 347, 172.5; 235/61.9, 61.10, 154, 61.1, 61.11 B, 61.11 E; 234/112

[56] References Cited

UNITED STATES PATENTS

| | | | |
|---|---|---|---|
| 2,638,270 | 5/1953 | Jones | 235/61.11 B |
| 2,720,164 | 10/1955 | Braun | 235/61.11 B |
| 3,237,164 | 2/1966 | Evans | 235/61.9 |
| 3,264,635 | 8/1966 | Shook | 340/347 DD |
| 3,280,309 | 10/1966 | Villwock | 340/347 DD |
| 3,376,557 | 4/1968 | Godinez | 340/15.5 |
| 3,448,247 | 6/1969 | Jones | 235/61.1 |
| 3,466,596 | 9/1969 | Siems | 340/15.5 |
| 3,488,661 | 1/1970 | Tanguy | 340/15.5 |
| 3,496,530 | 2/1970 | Brown | 340/15.5 |

Primary Examiner—Maynard R. Wilbur
Assistant Examiner—Robert M. Kilgore
Attorney—Johnson, Dienner, Emrich, Verbeck and Wagner

[57] ABSTRACT

An event recorder device for providing a record of digital pulses representative of parameters, such as angular travel of a rotating shaft on an electrical meter, in which a count of the pulses is cyclically accumulated for successive measured time intervals, the count for each period being temporarily stored in a memory and being read out to lock in corresponding ones of a set of punch devices so that a slow-moving crankshaft will record the locked information on a standard multilevel paper tape during the next succeeding time interval. The same mechanical system controls an electrical timer and gating circuit in the gating of count information from the memory to the punch mechanism in several discrete sets of data (or characters) in which the actual reading is a sum of the weighted bit positions in the first character times a fixed multiplier plus the sum of the weighted bit positions of the second character. A tape cassette is used to store the paper tape which is advanced several times by the same mechanical system in each predetermined time interval to permit multicharacter readout in each interval.

18 Claims, 25 Drawing Figures

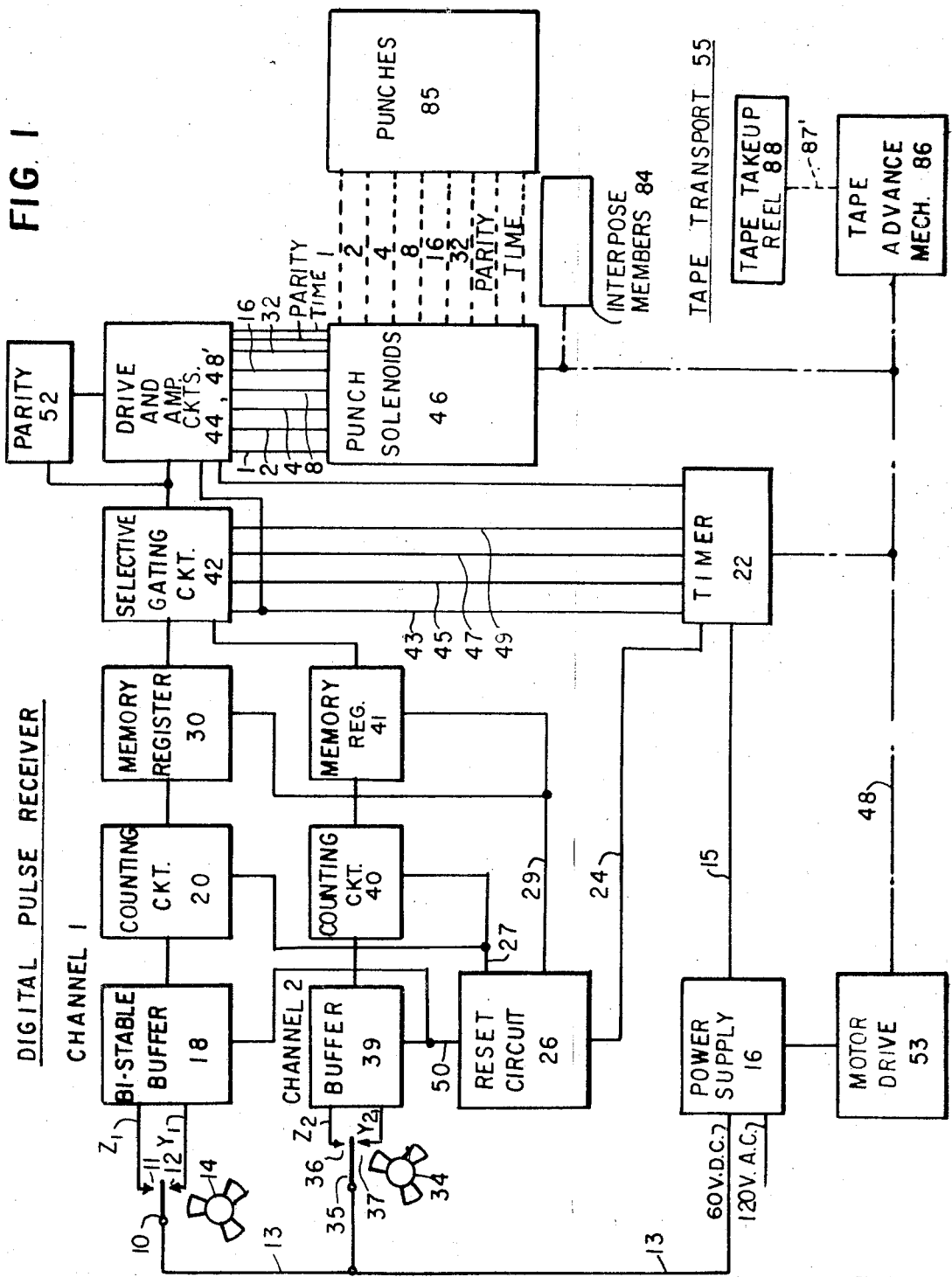

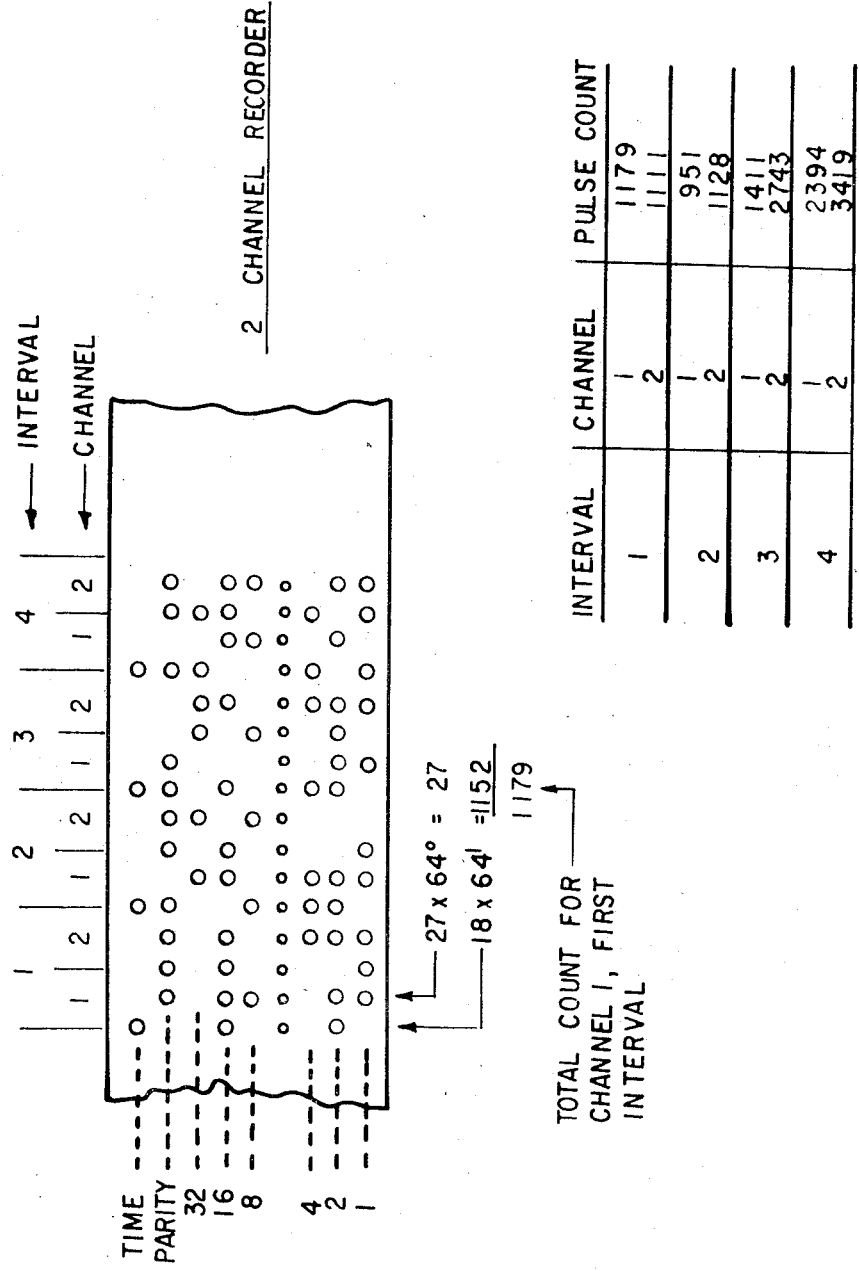

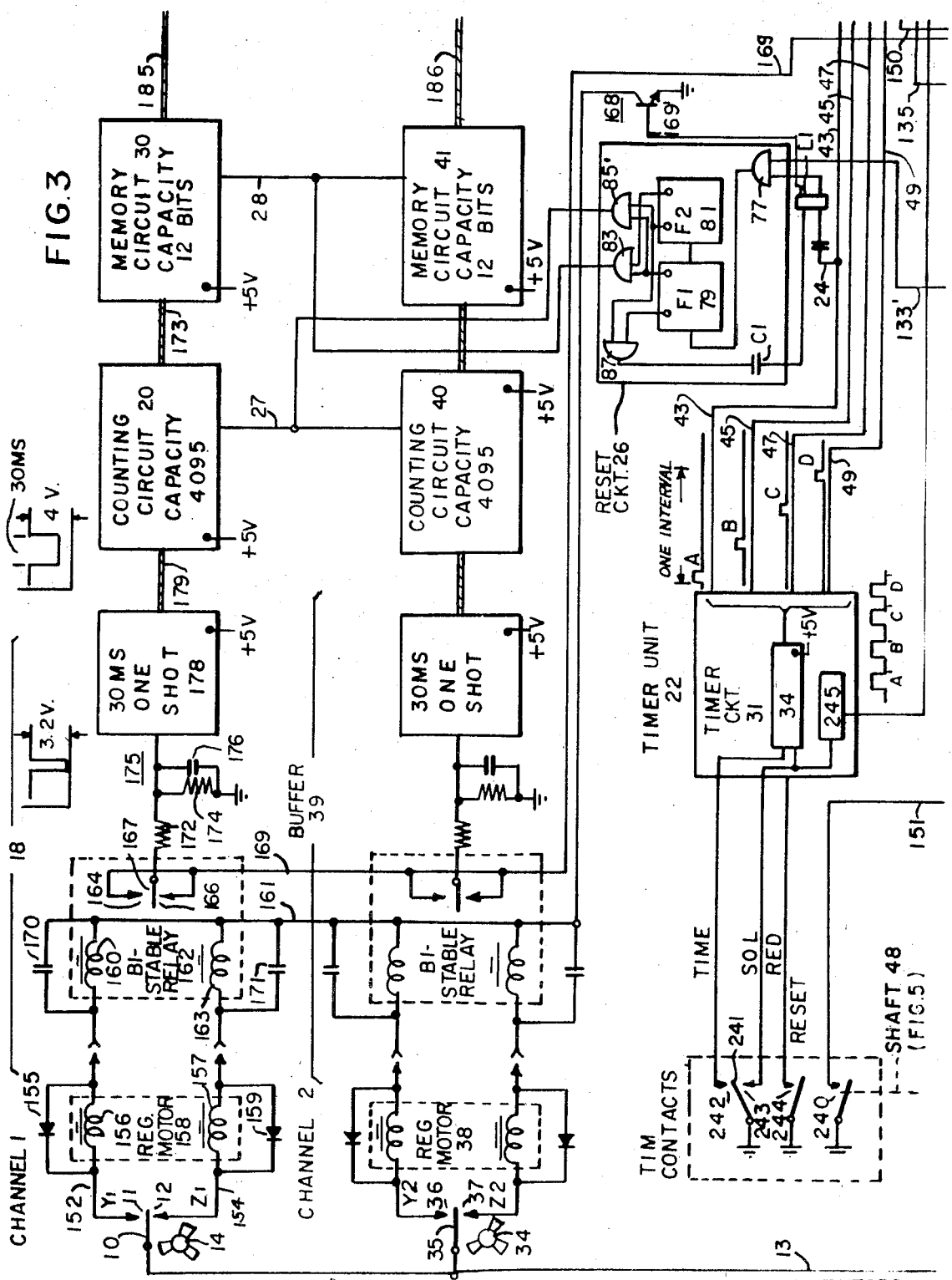

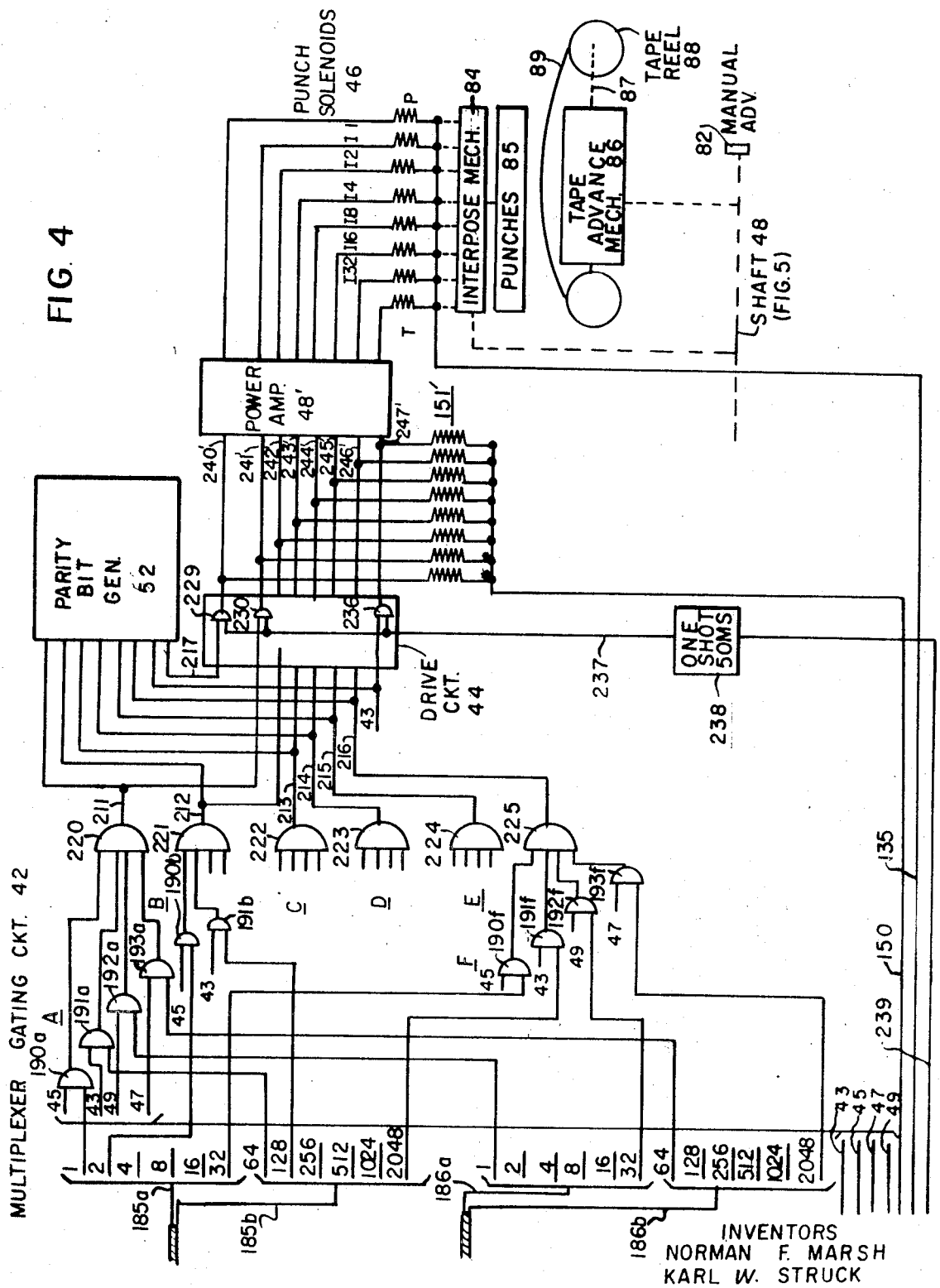

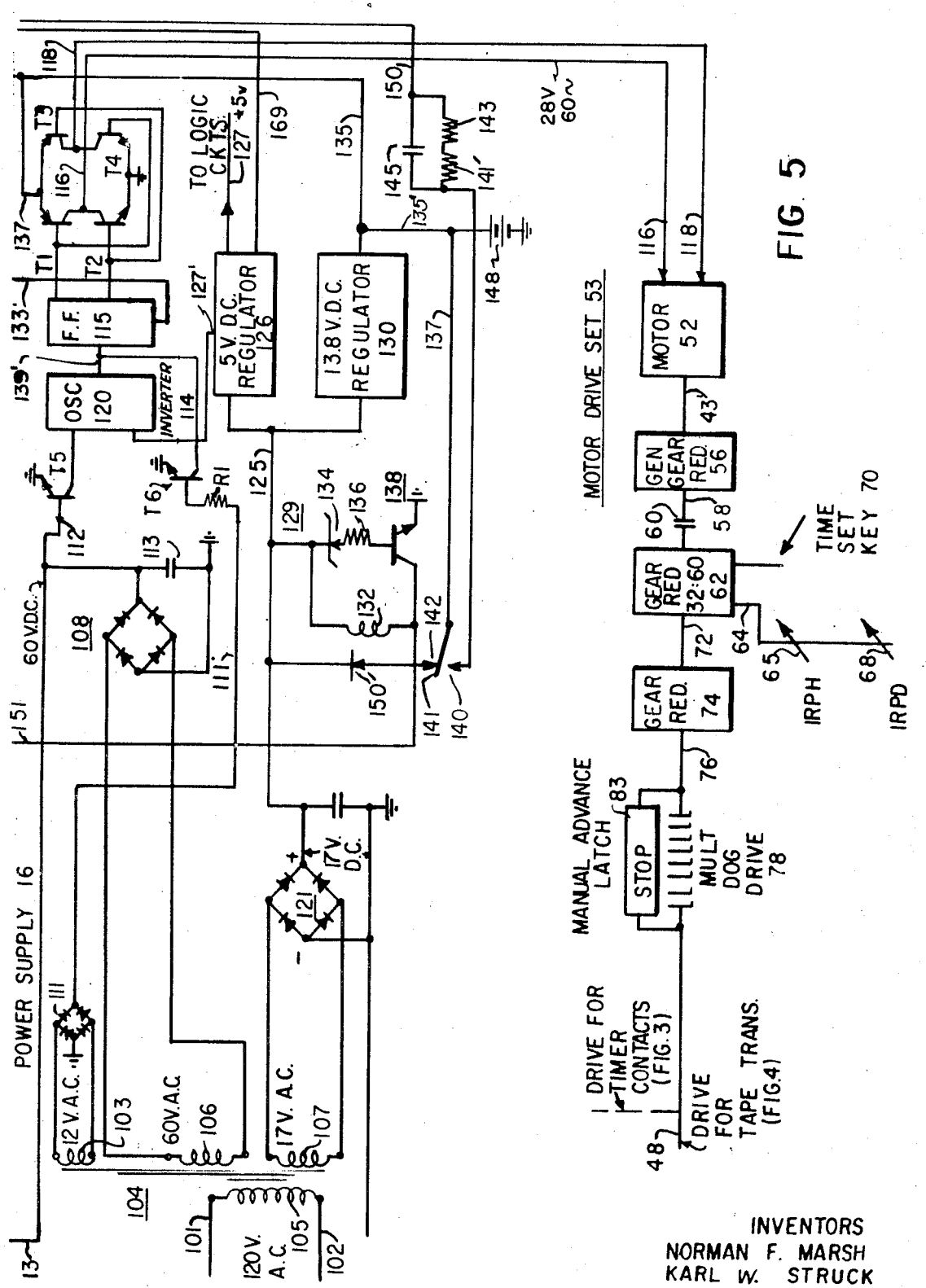

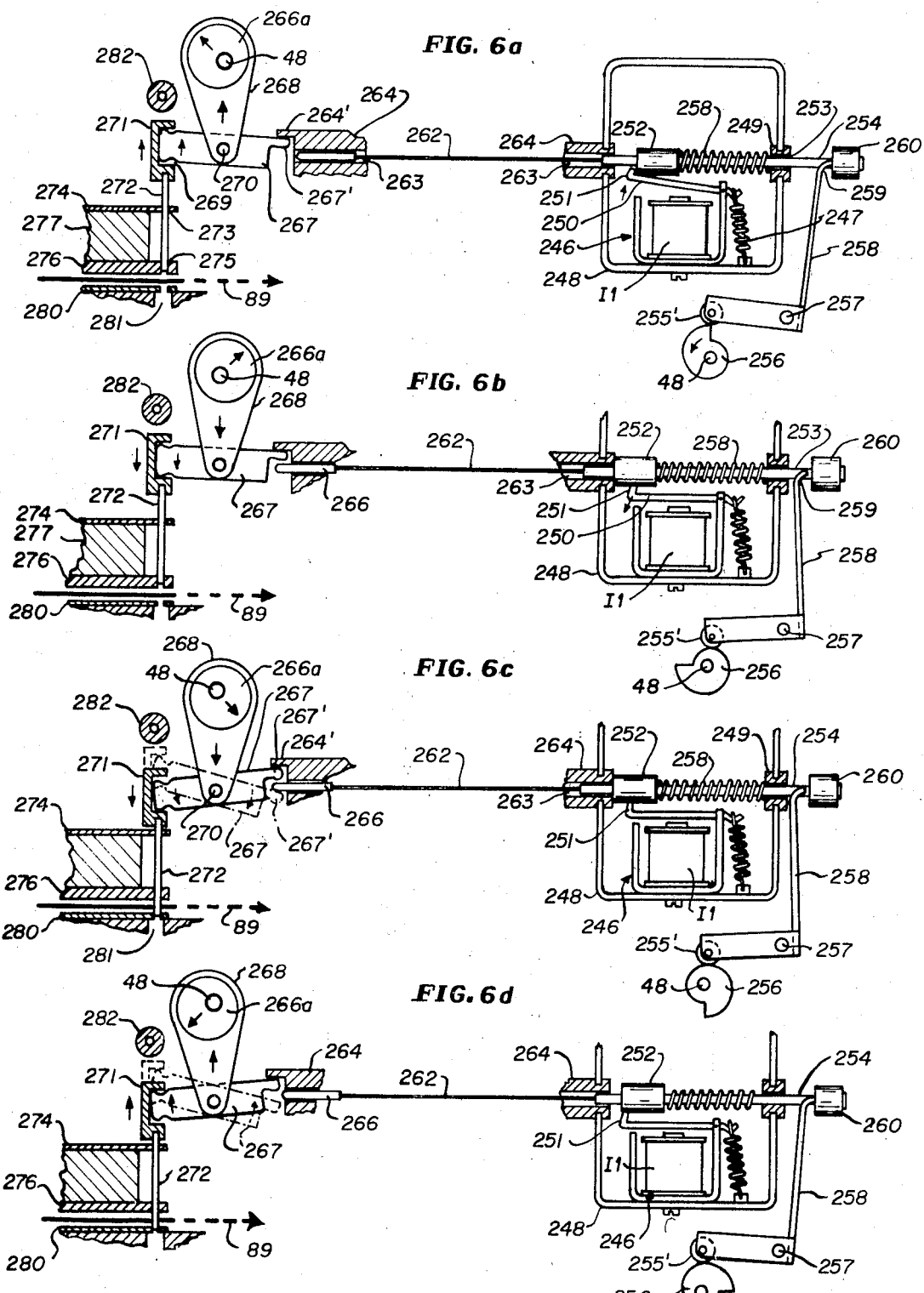

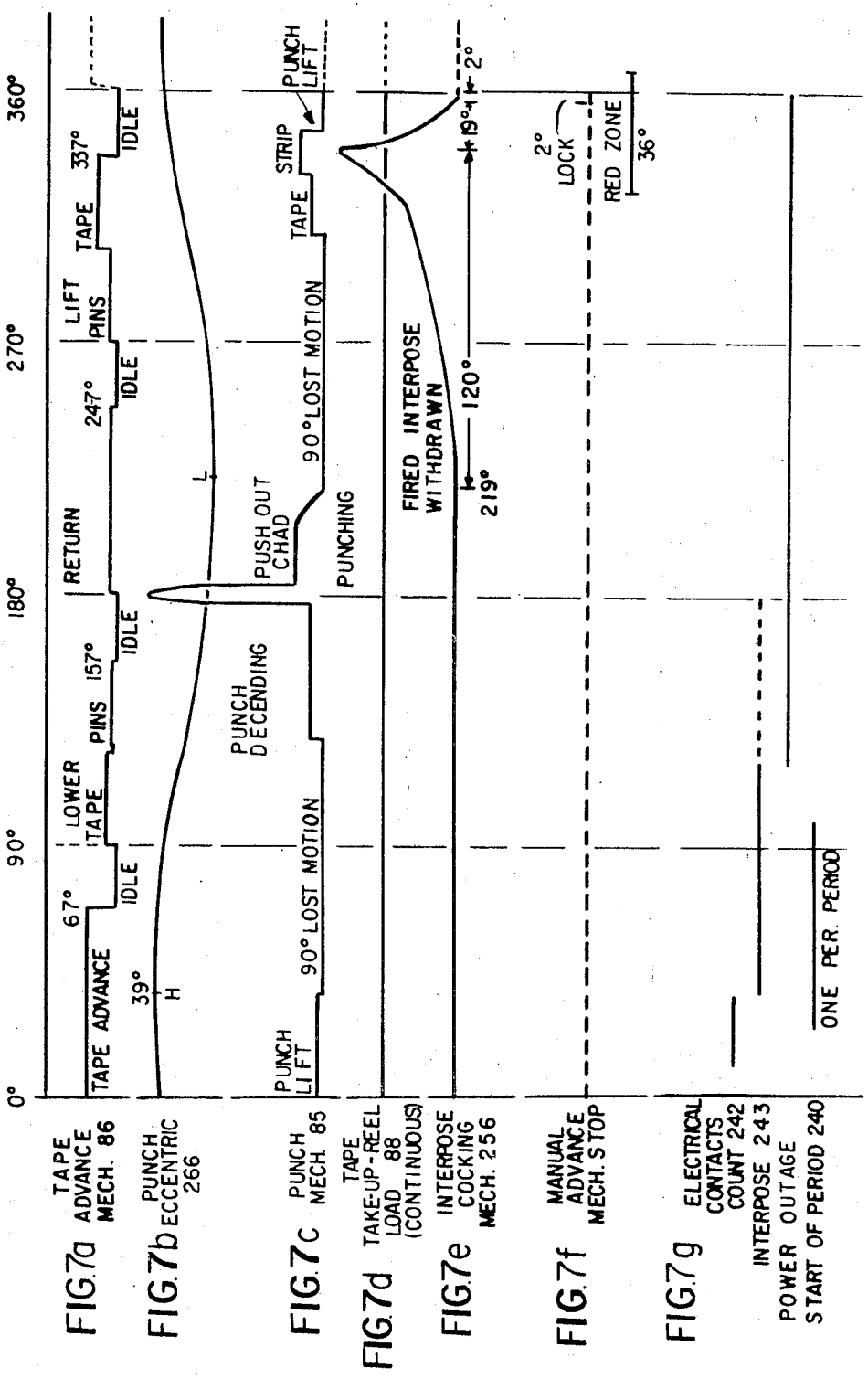

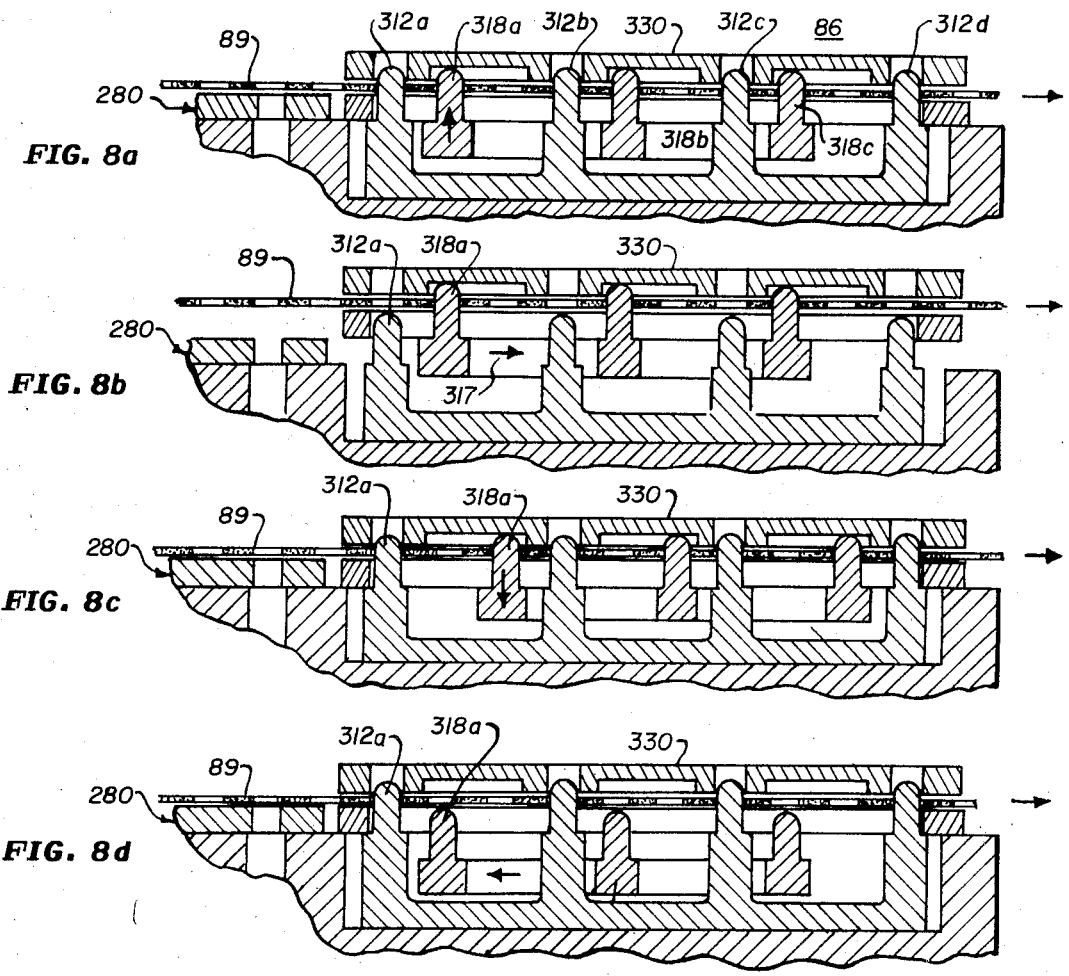
FIG. 8a
FIG. 8b
FIG. 8c
FIG. 8d
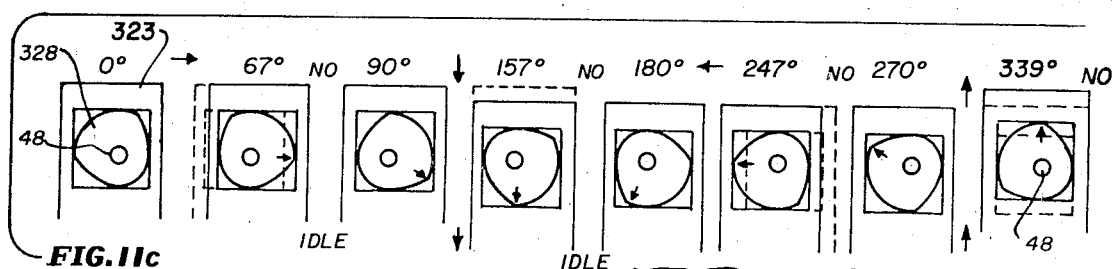
FIG. 11c
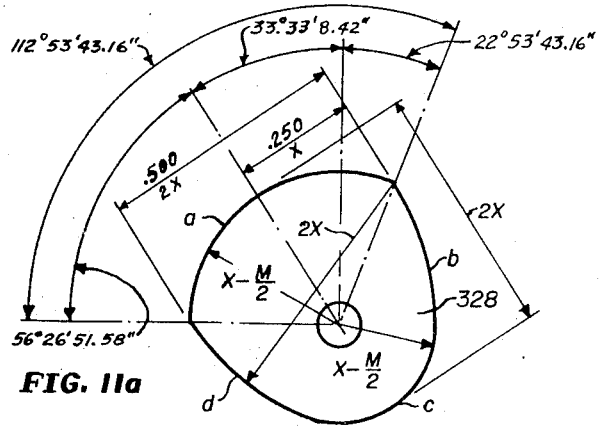
FIG. 11a
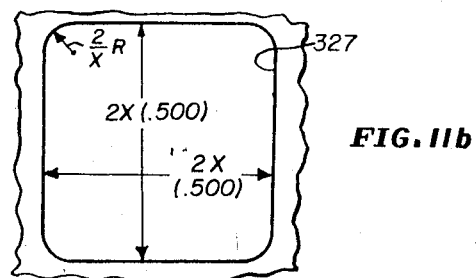
FIG. 11b
INVENTOR
NORMAN F. MARSH
KARL W. STRUCK
BY
ATTYS.

INVENTORS
NORMAN F. MARSH
KARL W. STRUCK
BY
ATTYS.

ELECTRICAL DATA LOGGING SYSTEM FOR UTILITY INDUSTRY

SUMMARY OF THE INVENTION

There has been an increasing interest on the part of utility distributors and system-planning engineers for a suitable device which is competent to provide a record of a large number of different electrical measurements in a manner which permits use of the resultant records with conventional automatic data processing equipment. The most attractive application for such device appears to be as a tool for use in study of customer usage, such as, for example, the load conditions for certain types of customers (or types of equipment) so that service arrangements and rate structures can be related to the loads involved. It is apparent that the provision of an increased amount of data relative to the load condition for processing by automatic data processing systems will result in a more thorough and complete analysis. While a large initial cost may be involved in the use of such device to procure the information, the cost is, in time, justified by the increased revenue obtained by reason of such measurement and study.

In addition to a recorder which may be used to advantage in temporary survey applications, it is desirable that the recorder be of a construction which permits use of the recorded information for billing purposes. That is, experience has shown that automatic billing equipment tends to minimize human error and to reduce labor cost, and there is therefore a growing practice in utilities to seek machine operation in their accounting procedures. The ability to use the same device which has utility in survey applications as equipment which provides billing information for use in standard accounting equipment makes the device a justifiable and inexpensive device for the utility.

In yet another area, it is desirable that the same unit have application as a system betterment device. By way of example, utility engineers are frequently concerned with the value of coincident load values at two or more points in a system. With such device at each point of service, information for each demand interval can be recorded and the sum of all loads during a given demand interval can be efficiently produced by automatic data processing of the tapes provided by the device. With the simpler types of billing equipment, cards developed from the information developed at each metering point are sorted with reference to the time periods involved, and the processing equipment then adds the readings for the corresponding demand intervals to provide the desired total. With the more elaborate system having memory units, the tape information is placed in memory, and the machine is set to separate the information for corresponding intervals and to add those values to acquire the desired total.

Other uses in the same field include determination of rate schedules for simultaneous maximum demand when two or more points of service are given to a single customer which points may be widely separated from one another. In yet another mode, the device may be used in the interconnection of two utility systems. One device may be connected to measure the "load out" and the other the "load in" at each interconnection point and with the resultant record provided by the device, the computer can produce accurate information on the net simultaneous load for each interval, select the maximum, compute the load, apply the proper multiplier and calculate the bill. In such instances it may be also desirable to measure reactive components so that net simultaneous volts and net simultaneous vars can also be used in the calculation of demand charges for each interval.

While digital recorder equipment has been known heretofore, there has been a need for a more compatible, flexible, reliable-type unit which serves each of these purposes. It is an object of the invention to provide a device which is so operative, and specifically which has the ability to monitor a plurality of different parameters and provide a punched paper tape which contains such data in a form compatible for use with known data processing equipment.

In a digital recorder device according to the invention which has four channels, for example, pulse information may be provided from four separate inputs to the four different channels. A mechanical electrical system accumulates the pulse count in each channel for a predetermined time period (15 minutes in the described embodiment) and at the start of the next timing interval transfers the count to associated memory means and resets the accumulator for count accumulation for the next predetermined interval.

It is a further object of the invention to provide gating means for effecting readout of the information from the memory in sequence, the information in each memory being gated in a novel pattern which permits the use of a standard eight-level tape in the recording of counts many times larger than normally available on eight-level tape (4,095 in the basic embodiment disclosed herein). The invention specifically provides means which provide electrical signals for two or more discrete characters from the information in each memory to a set of eight punch solenoids in which the actual readout is a sum of the weighted bit position in the first character times a fixed multiplier plus the sum of the weighted bit positions of the second character.

It is yet another object of the invention to provide a mechanically driven system with interpose members which are operated by the punch solenoid in a pattern determined by the information to be recorded on the eight-level tape in such a manner that a main crankshaft which revolves twice per channel in each time interval (15 minutes in the present embodiment) will slowly move the punch associated with each of the enabled interpose members to provide a corresponding pattern in the eight-level tape, whereby a relatively simple inexpensive and reliable record-preparing system is achieved.

A novel paper-tape-advancing mechanism which is also driven by the main crankshaft is operative to move a set of fingers in a novel rectilinear pattern to effect tape advance in a time sequence related to the mechanical punching operator and electrical gating of the information to the punch solenoids.

The paper tape is stored on reels in a cassette structure whereby in a simple operation a cassette which has been used to record the information is removed and a new cassette installed with practically no handling of the paper tape by the field man.

Total pulse count registers for each channel which have a capacity of 10 million counts each, are bistable so that no extra pulses are registered as a result of power outage.

The invention further provides a novel mechanical system which includes a timing motor connected to provide a predetermined drive for the system timer, the punch interpose members and the tape transport. The timing motor is driven by a solid-state inverter which is synchronized to line frequency when available and runs on an internal oscillator when line voltage fails. A rechargeable battery floats on regulated DC voltage and if line voltage fails, the battery feeds the inverter to provide a minimum carryover period of 2 hours during the power outage.

BRIEF DESCRIPTION OF DRAWINGS

In the accompanying drawings,

FIG. 1 is a schematic block diagram of the novel digital recorder device;

FIG. 2 is an illustration of the tape information provided on the tape unit;

FIGS. 3–5 when assembled illustrate the circuits used in the recorder device;

FIGS. 6a–6d illustrate the punch and interpose mechanisms used in the recorder;

FIGS. 7a–7g are a set of sequence graphs illustrating the relative time of operation of the recorder components in each cycle; and FIGS. 8a–8d, 9, 10, 11a–11c illustrate the novel tape advance mechanisms of the disclosure.

GENERAL DESCRIPTION

Figure 9:
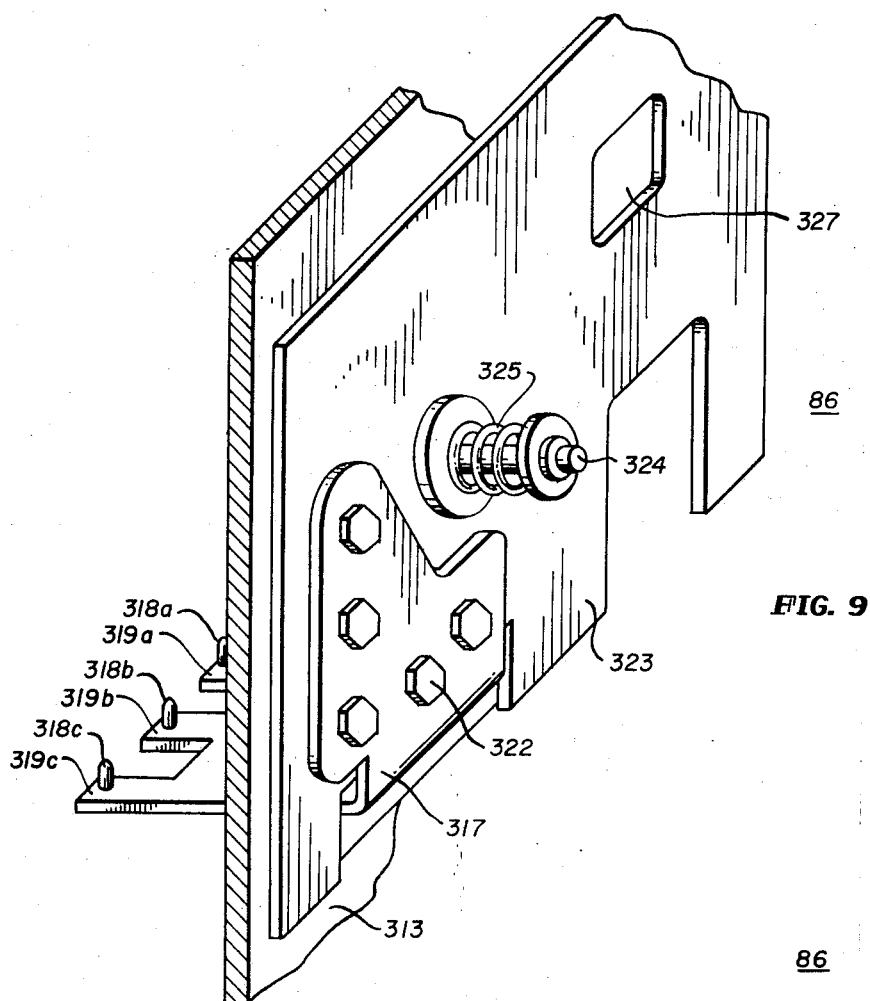

With reference to FIG. 1, there is shown thereat in block form, a novel two-channel digital recorder including the circuitry and mechanical system for such device. As there shown, Channel 1 of the system includes an input circuit having a movable contact 10 operable between a pair of fixed contacts 11 and 12 by a suitable cam member 14 which is associated with and operated by the particular device to be monitored by the unit. Movable contact 10 is connected over conductor 13 to a 60-volt DC output on power supply 16 which is energized by a conventional 120-volt AC source.

In a typical application as a demand recorder for an electrical power supply, cam 14 is mounted on the rotating spindle of the watt-hour meter (not shown), whereby contact set 10, 11 and contact set 10, 12 close three times to provide three 60-volt potential pulses over each of the input conductors Z1 and Y1 in each revolution of the watt-hour meter spindle. Cam 24 associated with the second channel may be mounted on the spindle of a second watt-hour meter to provide information to the second channel for a second power supply.

With reference to the first channel, the pulses input over conductors Z1, Y1, respectively, are fed to a bistable buffer 18 which includes a bistable relay and circuitry for shaping each input pulse for the system. The pulses output from buffer 18 are fed to a counting circuit 20 which in the present embodiment comprises a 12-flip-flop integrated circuit having three sets of four flip-flops interconnected to provide a total count of 4,095. In applications which require a larger count the number of flip-flop stages may be correspondingly increased. The second channel has a similar buffer 39 and counting circuit 40, which accumulates a count of the pulses input over conductors Z2, Y2.

The pulses received over the respective channels are cyclically accumulated in counters 20, 40 for a predetermined interval which is measured by an associated timer 22. As shown on FIG. 1, timer 22 is energized over path 15 by power supply 16 and includes mechanical contacts (not shown) controlled by a main crankshaft 48 to measure a predetermined timing interval for count accumulation (15 minutes in the illustrated embodiment). At the start of each of the timing intervals, timer 22 provides an enabling pulse over path 24 to a reset circuit 26, which is in turn operative over conductor 50 to inhibit the transmission of pulses from the bistable buffers 18, 39 to the counting circuits 20, 40 respectively. As will be shown, such signals do not interfere with the input of the pulses over the input circuit Z1, Y1, Z2, Y2 to the buffers 18, 39.

Reset circuit 26 at such time also provides a clock pulse over path 29 to a memory register 30 in the first channel and a memory register 41 in the second channel to cause the count information in counting circuits 20, 40 to be transferred to memory registers 30, 41 respectively. In addition reset circuit 26 sends a pulse over reset conductor 27 to cause the counting circuits 20, 40 to be reset to zero. After reset, the pulse on path 50 is removed by the reset circuit 26 to permit pulses in the buffer circuits 18, 39 to be transmitted to the counting circuits 20, 60 in the respective channels.

The reset function is performed at 120-Hz. clock rate so that the complete reset cycle takes less than one-thirtieth of a second. As a result, as will be shown, a pulse which might occur in a channel during the reset cycle is stored by the buffer in such channel, and will be forwarded to the associated counting circuit in the following timed interval.

While the timer 22 is shown to provide predetermined intervals of 15 minutes in the present embodiment, the length of the interval provided by the timer 22 may be altered to other values so that the number of pulses reasonably expected in each predetermined interval is less than the counting capacity (4,095) of the counting circuits (such as 20, 40) used in the system. It is also apparent that in the event the counting circuit capacity (4,095) of the present system is not sufficient, additional flip-flops may be added to expand the capacity of the system, whereby devices having a higher frequency rate of input pulses may be effected.

The pulse information accumulated in the counting circuits in one 15-minute interval as noted above is transferred to the associated memory circuits at the start of the next succeeding 15-minute interval. During such succeeding interval, timer 22 is also operative over paths 43, 45, 47, 49 to control a selective gating circuit 42 in the transfer of the information in each of the memory registers, such as 30, 41, over a driver circuit 44 and amplifier circuit 48' to a set of eight punch solenoids 46 to prepare the appropriate ones of the punch solenoids 46 for use in the punching of a paper tape with a binary representation of the total counts obtained in the preceding 15-minute interval in each channel.

According to a novel feature of the invention the actual count, which is provided in a 12-bit code at the output of the memory circuit 30, is divided into two six-bit sets of information so that the information may ultimately be provided as punched holes on a standard 1-inch computer compatible paper tape while yet providing counts, as in the present example, of up to 4,095 pulses per timing interval. That is, in the conventional eight-level tape, the total count which may be normally registered in a binary code by the recorder is limited to a total count of 255. If parity information is desired the total count is reduced to 127, and if time information is to be provided in one level the recording capabilities in the conventional system would drop to a count of 63. Such limitation would and has limited the potential utility of digital recording equipment.

According to the present invention, the 12-bit information in each memory register, such as register 30, is divided into two six-bit sets of characters which are punched out in sequential vertical columns on the tape. The two remaining levels in each column are reserved for time and parity information. In multichannel recorders, the information is punched on the tape as successive pairs of vertical columns. According to a further novel concept of the invention, gating of the count to punch solenoids 46 by timer 22 is effected at a relatively slow rate so that a slow-speed mechanical punch device may be employed. In such arrangement, timer 22 includes two flip-flop circuits which are operative through proper gating to four different states in each predetermined timing interval (15 minutes) in response to the four revolutions of crankshaft 48 in each such interval, whereby each of the four paths 33, 35, 37, 39 is marked by an enabling pulse by a different one of the four successive revolutions of the crankshaft 48 in each 15-minute interval.

The first pulse output over path 43 which occurs during the first revolution of crankshaft 48 in a timing interval effects gating of one set of six bits of information from memory register 30 in channel 1 to the driver and amplifier circuit 44, and the second pulse output over path 45 during the second revolution of crankshaft 48 in a timing interval effects transfer of the second set of six bits of information to the driver and amplifier circuit 44. In like manner, the first and second sets of six bit information in the memory register 41 in channel 2 are transferred to the driver and amplifier circuit 44 by pulses on paths 47, 49 during the third and fourth revolution of crankshaft 48 in the 15-minute interval.

A parity circuit 52 connected at the output of selective gating circuit 42 detects the six bit signals as output over gate 42 and provides a parity marking over a seventh path in the driver and amplifier circuit 44 whenever the total number of "1" bits at the output of selective circuit 42 is even.

The successive timing intervals are marked on the tape by a punch hole in the eighth level of the first column of each time period. The first pulse in each time period is fed over path 43 and over conductor 43' to driver and amplifier circuit 44 to effect punching of such hole. Thus in a tape used for a single-channel system, the first vertical row of each pair of vertical rows will contain a time hole; in the two-channel embodiment of the present disclosure, the first vertical row of each set of four vertical rows will contain a time hole.

The actual operation of the punches in translation of the information represented by the enabled ones of the solenoids into holes in the tape is controlled by the crankshaft 48 which is driven by a motor drive set 53 at the relatively slow rate of 16 r.p.h., whereby the punchout of the information stored in the two memories takes approximately 15 minutes. Such arrangement is unique in that it does not require high-speed movement of the punches to form holes in the paper and permits the use of a slow-moving crankshaft to effect punching of the tape, whereby a substantially simplified mechanical readout system of longer life is provided in a more economical configuration. The shaft member 48 is also connected to the tape transport 55 to provide mechanical drive for the tape advance mechanism 86 and the drive for the takeup reel 88. Shaft member 48 is further connected to control reset of interpose members 84 which are operative with the punch solenoids 46 to enable the ones of the punches 85 required to provide the proper holes in the tape.

With brief reference to FIG. 2, there is shown thereat the four successive readings (eight sets of six-bit information) which are provided on the tape for a previous 15-minute interval (the actual punching of a set of information being effected during the 15-minute interval which immediately follows a previous interval). In the illustrated example of FIG. 2, a count of 1179 was accumulated in memory circuit 30 of Channel 1, and a count of 1,111 was accumulated in memory circuit 41 in Channel 2. The first vertical row or columns of holes in the eight level tape provides $64^1$ information stored in memory circuit 30 which, in the present example, consists of a punched hole in the second level (2), a punched hole in the sixth level (16), and a time hole in the eighth level. The second vertical column provides the count for the $64^0$ information stored in memory circuit 30 and in the present example is shown to include punched holes in the first level (1), second level (2), fourth level (8), fifth level (16) and a parity hole in level 7 (a parity hole being provided whenever the number of holes in the vertical column is even, so that odd parity is always provided).

The count represented by the first vertical column in FIG. 2 is $18 \times 64^1 = 1,152$ and the count represented by the second vertical column is $27 \times 64^0 = 27$, whereby the total count for the first 15-minute interval for Channel 1 as represented by the first two vertical columns in FIG. 2 is $27+1,152 =1,179$. As shown in FIG. 2, the pulse count for Channel 2 during the same predetermined time interval as represented by the holes in vertical columns 3 and 4 is 1,111.

Stated summarily, the actual reading provided is a sum of the weighted bit positions in the first character times 64 plus the sum of the weighted bit positions in the second character times 1. Manifestly a higher count can be provided by including a third vertical column in which event the sum of the weighted bit positions in the third column would be multiplied by 4,096 to give a total count of 262,143.

During the second 15-minute interval (during which the readout of the count obtained during the first interval is effected) a second count is accumulated in the counter circuits 20, 40 in each of the Channels 1 and 2. During the third 15-minute interval, the second count is transferred to the memories 30, 41 and is gated to the solenoids 46 to provide four more vertical columns of holes which in the example shown in FIG. 2, is 951 and 1128. The manner in which the total count for four 15-minute periods (one hour) for two separate channels is provided on a paper tape will be apparent from such showing.

SPECIFIC DESCRIPTION

With reference to FIGS. 3, 4 and 5, there is shown in detail thereat the novel digital recorder circuit which provides a tape record of pulses input from one or more single-pole, double-throw contact devices.

POWER SUPPLY

The power supply 16 (FIG. 5) for the system is adapted for connection to a conventional 120-volt AC source and is operative to provide (a) 60-volt DC potential over conductor 13 to provide pulse potential for the inputs to Channels 1 and 2, (b) 60-cycle 28-volt peak-to-peak square wave pulses over conductors 116, 118 to the drive motor 52 for the system mechanical drive set 53, (c) 5-volt DC potential over path 127 for the logic circuits, and (d) 13.8-volt DC potential over path 135' for maintaining a charge in the battery 148, which is connected to feed power automatically through diode 150 during power outages. A sensing circuit 129 in the power supply 16 shuts the entire system down when the end of useful battery energy is reached during an extended power outage.

More specifically, the power supply 16 as shown in FIG. 5 basically comprises a pair of input conductors 101, 102 which are adapted to be connected to a conventional 120-volt AC input to supply power to the primary winding of a transformer 104. A secondary winding 106 on transformer 104 provides a 60-volt AC output to the input terminals of a rectifier bridge 108, one output terminal of which is connected over conductor 13 to provide a source of power for the channel inputs (FIG. 3) to be described and over conductor 112 to the inverter circuit 114.

Secondary winding 107 on the input transformer 104 provides 17-volt AC potential to a second diode bridge rectifier 121 which at its output provides an 18-volt DC potential over conductor 125 to a 5-volt DC regulator 126 and a 13.8-volt DC regulator 130. The output of the 5-volt DC regulator 126 is fed over conductor 127 to provide +5-volt DC supply current for the logic circuits in the system and over conductor 127' to inverter circuit 114.

Inverter circuit 114 includes a flip-flop circuit 115 which operates between two states in response to the input pulses fed thereto over conductor 111', resistor R1, transistor T6 by diode bridge 111, which is connected to a 12-volt, 60-cycle secondary winding 103 on the transformer 104. With the flip-flop in one of the states, transistors T1 and T4 conduct to connect 12-volt potential from battery 148 over conductor 137, transistor T1, conductor 116, motor 52, conductor 118 and transistor T4 to ground.

In the alternate state, flip-flop 115 enables transistor T3, T2 to place potential from battery 148 over conductor 137, transistor T3, conductor 118, motor 52, conductor 116 (i.e., the current is now passed through motor 52 in the opposite direction), and transistor T2 to ground.

An oscillator circuit 120, which is provided as an auxiliary source of power for motor 52, is connected over conductor 127' to the output of 5-volt DC regulator 126. A transistor T5 having its base connected over conductor 112 is normally turned on to connect ground to oscillator circuit 120 and thereby maintain the oscillator circuit cutoff.

In the event of a power outage, however, the potential on conductor 112 drops, transistor T5 turns off and the oscillator circuit 120 is enabled by the 5-volt potential on conductor 127 to drive the flip-flop 115 between the two states described above at the 120-cycle rate. The inverter circuit 114 is thus operative to provide 60-cycle, 28-volt peak-to-peak square wave pulses over conductors 116 and 118 to the H motor 52 in the motor drive set 53. Further the inverter 114 is synchronized to line frequency when voltage is available over conductor 112, and runs on the internal oscillator 120 and battery only when the line voltage fails.

The 13.8-volt DC regulator 130 in normal usage provides a constant recharge over conductor 135' for the battery 148 to maintain the battery in a fully charged condition.

A sensing circuit 129 for detecting a low battery voltage includes a relay 132 connected between conductor 125 and over transistor 138 to ground, and a diode 134 and resistor 136 which are connected between conductor 125 and the base of transistor 138 to detect a decrease of the voltage below 10.5 volts on conductor 125. That is, with 18 volts on conductor 125, transistor 138 is normally conductive and relay 132 is operated by a circuit which extends from the 18-volt DC potential which appears on conductor 125 and over the conducting transistor 138. In the event the power fails or drops below 12 volts, the 12-volt potential of battery 148 is fed over conductor 137 and contacts 14, 142, diode 150' and conductor 125 to the regulators 126, 130.

In the event the voltage further decreases below 10.5 volts, transistor 138 turns off, and relay 132 restores, and at its contacts 140, 141 completes a charging circuit for capacitor 145 which extends from the battery 148 over conductor 137, contacts 140, 141, capacitor 145, conductor 150 and resistances 151' (FIG. 4) which, as will be shown, set the solenoids to provide a punch hole in each level of the tape to violate parity, and thereby indicate an outage condition on the tape for the readout equipment.

A set of contacts 240 (FIG. 3) controlled by the main crankshaft 48 close at a predetermined time in each cycle of the shaft to insure that the relay 132 in the sensing circuit will be held operated until such part of the cycle is completed. If such precaution were not taken, an outage of such time in the machine cycle would not operate the punches to violate parity as desired. That is, even though the punches were set (but not operated) during such part of the cycle, the punches upon resumption of power would be reset without accomplishing the assigned function, and by holding relay 132 operated the crankshaft will be advanced to a point at which parity violation is insured.

MECHANICAL DRIVE

The mechanical drive set 53 as shown in FIG. 5 basically comprises an hysteresis-type synchronous motor 52 which is energized over conductors 116, 118 output from inverter circuit 114 in the power supply 16 and which through a plurality of gear sets drives a main crankshaft 48 at 16 r.p.h. (in a two-channel system). The main crankshaft 48 in turn drives the timer contacts (FIG. 3) and selected ones of the interpose members 84 (FIG. 4) to operate corresponding ones of the punches 85; and the tape advance mechanism 86 which in turn drives the takeup reel 88 in the tape cassette (not shown).

As noted above, the drive motor 52 for the shaft 48 (FIG. 5) is energized by 28-volt peak-to-peak square wave pulses output over conductors 116, 118 from solid-state inverter 114 in the power supply 16. Inverter 114 is synced to line frequency when line voltage is available, and runs on the internal oscillator powered by battery 148 when the line voltage fails.

Motor 52, which may be of the type commercially available from Sangamo Electric Company, Springfield, Illinois as Type H synchronous motor, operates at approximately 450 r.p.m. and at its output shaft 43' drives gear reduction unit 56 which has an output shaft 58 operable at approximately 1 r.p.m. connected via a unidirectional clutch 60 to the input for a gear reduction unit 62 which has a 32:60 ratio. Gear reduction set 62 via shaft 64 drives a 1-hour clock dial 65 which in turn drives a 24-hour clock dial 68. Suitable engaging means are provided for a time key 70 which permits adjustment of the clock dial to the desired time of day setting. The 1-hour clock dial 65 has identified (on the face thereof) the four 15-minute intervals during which the system accumulates the counts in each channel, and thereby identifies the particular interval in which the count is being made at any time, as well as the time in the interval.

Gear reduction unit 62 via output shaft 72, which operates at approximately 32 r.p.h., drives an interval gear reduction set 74 which has its output connected to an output shaft 76 which is in turn connected through a multiple dog drive 78 to the main crankshaft 48 for the mechanical system, the interval gear reduction set 74 driving the main shaft 48 through the multiple dog drive 78 at 16 r.p.h.

A manual advance 82 (FIG. 4) driven by the main crankshaft 48 permits advance of the shaft from any point in an interval to a point just short of a point at which an interval is terminated. At that time a manual advance stop 83 drops to prevent further manual movement of the main crankshaft 48.

The main crankshaft 48 drives a set of contacts 240-244 in the timer unit 22 (FIG. 3). In a two-channel system, such as shown herein, a cam (not shown) on shaft 48 closes each of the contact sets 241, 242; 241, 243 four times in each 15-minute interval. Timer shaft 48 (through suitable gearing—not shown) also operates contacts 244 every fourth revolution of the shaft to insure that the system is in synchronization at the start of each new timing interval and further operates contact set 240 once in each revolution to insure that the relay 132 in the sensing circuit will hold until such time as the system advances to a point at which a record of the outage is insured.

Timer shaft 48 also operates a punch head eccentric (to be described) to effect punching of a vertical column of holes on the tape once in each revolution of the shaft 48 (at approximately 180° of the shaft rotation) whereby four columns are provided in each 15-minute interval. Shaft 48 also operates cams (to be described) in interpose mechanism 84 to effect reset of the presence of the interpose members which are used to enable the ones of the punches 85 selected by punch solenoids 46, which reset occurs at approximately 213°-337° of each shaft revolution. Drive shaft 48, through mechanism to be shown in more detail, also drives the tape advance mechanism 86 through a rectilinear pattern once in each revolution of the shaft 48 which movement includes a lateral movement to effect advance of the paper tape 89, a downward motion to effect lowering of the tape 89 onto accurately positioned guide pins for punching purposes, return of the advance mechanism laterally to its initial position, and vertical movement to lift the tape 89 preparatory to advancement of the tape in the next cycle. The tape advance mechanism 86 in turn drives the cassette takeup reel 88 as will be shown in more detail hereinafter.

MONITORING OF PULSE COUNT OUTPUT OF ASSOCIATED EQUIPMENT

With reference now to FIG. 3, it will be assumed that the cam 14 shown thereat is mechanically linked to the spindle of a watt-hour meter which is rotating in known manner to provide a measurement of the power input to a particular installation. During each revolution of the meter spindle, cam 14 operates contact 10 into engagement with each of the fixed contacts 11, 12 three times. A count of the total number of pulses provided by such contact sets in a given period of time will therefore be a direct measurement of the number of turns of the meter spindle, and also the amount of power consumed.

In the present system, the count will indicate the power used in each 15-minute interval, and by examining the counts recorded on the tape in each 15-minute period for a 24-hour period, it is possible to obtain an indication of the particular periods in each 24-hour period in which greater and smaller amounts of power are required, as well as the extent of such demand in such intervals. While such application is given for exemplary purposes, it is apparent that the digital recorder has utility in any arrangement in which an event, quantity or equipment to be monitored may be represented by digital pulses.

As noted above, the cam 14 (FIG. 3) on the meter spindle operates the movable contact arm 10 into contact with the fixed contacts 11 and 12 three times in each revolution of the shaft. If an installation requires a larger or smaller count in the same time interval, more or less projections are provided on the cam 14.

With each closure of the contacts 10, 11 by cam 14, a 60-volt potential signal is fed from the power supply 16 over conductor 13 and contacts 10, 11, the upper coil 156 of a register motor 158 (which may be of the type commercially available from Haydon Switch & Instrument Company) to the upper winding 160 of a bistable relay 162 and over conductor 161 to normally conducting inhibit transistor 168 and ground. During the alternate periods in the spindle revolution in which cam 14 closes the contacts 10, 12, the 60-volt potential output provided over conductor 13 from the power supply 16 is fed over conductor 154, the lower coil 157 of the register motor 158, and the lower coil 163 of the bistable relay 162, conductor 161 and inhibit transistor 168 to ground.

The register motor 158 is operative with energization of either coil 156 or 157 to advance the total count of the pulses registered on an associated mechanical register. Such register is used to provide information relative to the total number of pulses transmitted over the respective conductors for a given period of operation of the digital pulse recorder. In the exemplary application set forth herein in which a watt-hour meter is maintained in the field, it would not be uncommon for the unit to be left unattended in the field for periods of 2-4 weeks before the used tape cassette is removed, and a new tape cassette is installed. The total pulse count for the extended period which appears on the register device associated with the upper register motor will therefore indicate the total power consumed during such period. Diodes 155 and 159 are connected across the register motor coils 156 and 157 for arc suppression purposes.

Bistable relay 162 is responsive to each such operation of contact set 10, 11 to operate contacts 164, 167 to the closed position and to hold the contacts in such position until such time as its lower coil 163 is energized by a further pulse input over contact set 10, 12. As lower coil 163 is energized, contacts 166, 167 are closed and are held closed until upper coil 156 is once more energized by a subsequent pulse received over contact set 10, 11. Capacitors 170 and 171 are connected across the bistable relay coils 160 and 163 respectively to provide a holding potential for the relay to minimize the possibility of relay chatter responsive to transients in the system.

As will be shown, at the beginning of each timing interval of the system (15-minute timing intervals are used in the present system) the inhibit transistor 168 is cut off by reset circuit 76 to inhibit operation of the bistable relay 162 for a period of approximately 30 milliseconds during which reset of the counting circuit 20 is effected. Since the contact sets, such as 10, 11, or 10, 12, are closed for a period longer than 30 milliseconds, it will be apparent that even though a change in the condition of the input contact sets occurs during the period that the inhibit transistor 168 is nonconducting, the circuit will be operative at such time as inhibit transistor 168 is once more made conductive to effect registration of the count on the bistable relay 162 (i.e., the count which would have occurred if the bistable relay 162 had not been inhibited as the contacts transferred position).

As shown in FIG. 3, 5-volt potential is continually provided to contacts 164, 166 over conductor 169 by regulator 126 in power supply circuit (FIG. 5). Movable contact 167 is in turn connected over resistor 172 and pulse-shaping circuit including resistor 174 and parallel-connected capacitor 176 to a 30-millisecond one-shot multivibrator 178.

As shown by the waveform adjacent the pulse-shaping circuit 175, as movable contact 167 transfers between contacts 164, 166 (in either direction) a pulse input is applied during the brief period of transfer of the movable contact 167 which transfer occurs in a time period which is in the order of from 50 to 500 microseconds. That is, during the period of transfer from contacts 166 to 164 for example, the 5-volt input over contacts 166, 167 to the one-shot multivibrator 178 is interrupted, and during the transfer period the voltage drops to approximately zero volts. As the contacts 167 and 164 close, the voltage to the multivibrator 178 returns to 3.2 volts.

One-shot multivibrator 178 is operative in response to the receipt of each such pulse to provide a 30-millisecond pulse output to the counting circuit 20. As shown by the waveform adjacent conductor 179, the 30 ms pulse output from circuit 178 is in the order of 4 volts. The one-shot multivibrator circuit 178 in addition to providing a pulse of uniform shape and amplitude for each input pulse (which may vary significantly in duration), additionally acts as a buffer for the 30-millisecond period during which the pulse appears at the output side on conductor 179.

The pulses output from the one-shot multivibrator 178 are fed to a counting circuit 20 which basically comprises 12 flip-flop circuits in an integrated circuit arrangement which is of the type commercially available from Texas Instruments under the designation SN7493N. Such circuitry, in effect, comprises three sets of four flip-flops, each so arranged that the 12 output leads from the 12 separate components will provide an indication in a binary code of the number of pulses fed over the input circuit 179. It should be noted that while the maximum capability of the counting circuit 20 is 4,095, the system may be modified to include a counting circuit of higher capacity if the application so warrants. The total capacity of the counting circuit required in any use is basically determined by the number of impulses which may be predictably received over the input circuit Y1, Z1 for a channel in the timing interval selected for the system.

As each pulse is fed over the input circuit 179, counting circuit 20 advances one count, whereby the number of pulses input over conductors 152, 154 for the first channel will be accumulated in the counting circuit 20.

As noted above, additional channels may be provided for use in monitoring additional equipment. A second channel 2 which is identical in structure to channel 1 is shown for exemplary purposes in FIG. 3. A rotating cam 34 driven by the device to be monitored operates movable contact 35 between fixed contacts 36 and 37, and pulses are provided over inputs Y2, Z2, register motor 38, buffer circuit 39 to the counting circuit 40 which counts each input pulse and accumulates a total count of such input pulses during each selected interval of the recorder. It will be apparent that if further devices are to be monitored, additional channels, such as illustrated Channels 1 and 2, will be added to the system.

TRANSFER OF COUNT TO MEMORY CIRCUIT

The counts stored in counting circuits 20 and 40 in the respective channels for a 15-minute interval are transmitted to associated memory circuits, such as 30, 41, respectively during the initial portion of the next 15-minute interval.

More specifically, the memory circuit 30 basically comprises three sets of four flip-flops, which in one embodiment comprised an integrated circuit SN7475N available from Texas Instruments, and identified as a Quadlatch. In such arrangement, each flip-flop in the memory circuit, such as 30, has a separate input connected over 12 conductors in cable 123 to a correspondingly different one of the 12 outputs of the flip-flops in its associated counting circuit, such as 20. Accordingly, each of the 12 inputs to the memory circuit have a "0" or "1" marking thereon, the total set of markings identifying the count registered on the flip-flop in the counting circuit, such as 20. As a transfer signal is received over conductor 28 from the reset circuit 26 (to be described), the 12 flip-flops in the memory circuit 30 are controlled by the signals in the 12 conductors 183 to assume a state represented by the marking on its input circuit (and thereby the states of the 12 flip-flops in the counting circuit 20). Such transfer pulse, as will be shown, occurs in the early portions of each 15-minute interval (approximately 8° of rotation of timer shaft 48).

Reset circuit 26 also provides a second pulse over conductor 27, slightly delayed relative to the transfer pulse, which resets the counting circuits, such as 20 and 40, to zero so that a new count will be accumulated during the next 15-minute interval.

Briefly, reset circuit 26 comprises a pair of flip-flop circuits 79, 81 which are gated by gate 77 to provide four outputs 00, 10, 01, 11 in response to a pulse input over conductor 24 at the start of each interval. Gate 77 as shown has one input connected over conductor 133' to receive the 120 c.p.s. square wave output of inverter 114 and a second input connected to a flip-flop L1 which is in turn connected to timer circuit 31. The output of gate 77 is connected to a flip-flop circuit F1.

With the occurrence of a pulse on conductor 26' at the start of a cycle, flip-flop L1 changes state and gate 77 gates the 120-c.p.s. pulses on conductor 133' to flip-flop 79. As the first four pulses are received the flip-flop circuits 79, 81 advance through the four states 00, 10, 01, 11. Gate 83 is connected to operate on state 00 and accordingly a transfer pulse is fed over conductor 28 to the memory circuits 30, 41. The second state of flip-flops 79, 81 is not used. As the flip-flops advance to the third state 01, gate 85 is enabled to provide a reset pulse over conductor 27 to the counting circuits 20, 40. At the fourth input pulse gate 87 recognizes the state 11, and provides a pulse over capacitor C1 which differentiates the leading edge and controls flip-flop L1 to change state and once more block gate 77.

During the period of enablement of gate 77 (and therefore transfer of the count from the counting circuits 20, 40 to their respective memory circuits 30, 41), a signal over conductor 169' effects cutoff of inhibit transistor 168 which prevents operation of bistable relay 162 from its existing condition even though the cam 14 might effect transfer of contacts 10 from one contact, such as 12, into registration with the other contact, such as 11. Since the period of transfer is in the order of one-thirtieth of a second and the contacts as operated by cam 14 have a significantly longer make period (i.e., in the order of 0.10 seconds in the illustrated system) the occurrence of a change of contact position during information transfer will merely result in a brief delay in recording of the pulse. That is, as the inhibit signal is removed from transistor 168 after the transfer of the information to the memories, and assuming contact 10 moved into engagement with contact 11 during such period, the contacts 10, 11 will cause the bistable relay 162 to adjust to the new position as the inhibit transistor 168 is again turned on, and the count will be registered. Thus no pulses are lost—any pulse which occurs during reset will always be registered immediately after the reset operation is completed.

The output circuit of the memory circuit 30 comprises 12 parallel conductor outputs in cable 185, each of which conductors is connected to a different one of the 12 flip-flops in the memory circuit 30. The output of memory circuit 41 is connected in like manner over 12 conductors in cable 186. The output conductors in cables 185, 186 are connected to a multiplexer selective gating circuit 42. As shown in FIG. 4, the input conductors to the selective gating circuit 42 for the two-channel unit of the present embodiment are divided into four groups of six, the first group 185A consisting of the conductors connected to the particular outputs from the flip-flops in memory circuit 30 which represent the digits 1,2,4,8,16 and 32 of the count in the binary code, and the second group 185B of conductors being connected to the outputs of the flip-flops which represent the numbers 64, 128, 256, 512, 1,024 and 2,048 in the binary code. The twelve output conductors 186 from the twelve flip-flops in the memory circuit 41 are divided into two groups 186a, 186b in a like manner.

Gating circuit 42 includes six groups A–F of AND gates, each group having four AND gates. Each of the four gates in a group, such as for example, gate 190a-193a in the first group A, has a clock input connected to a different one of the timer conductors 45, 43, 49, 47, respectively, which, as will be shown, are enabled at successive, different time periods in each of the predetermined 15-minute intervals in the system. The four gates in each of the other five groups of gates for the memory circuit 30 in Channel 1 have clock inputs connected in a like manner (see for example gates 190f-193f in the sixth group of gates F).

A second input on each of the gates in each group A–F, such as gates 190a-193a in group A, for example, is connected to a different but related one of the output conductors from the memory circuits 30, 41. The four gates, such as 190a-193a, for example, are respectively connected to the first conductor in the four conductor groups 185a, 185b, 186a, 186b. Thus the input lead for gate 190a is connected to the first conductor "1" of the conductor group 185a, the input lead for gate 191a is connected to the first conductor "64" of the conductor group 185b. The corresponding input for the four gates in the second group (not shown) are connected respectively to the second conductor (2,128,2,128) of groups 185a, 185b, 186a, 186b, etc. The sixth group of gates 190f-193f in like manner have their second input connected to the sixth conductor (32, 2,048) of the group 185a, 185b, 186a, 186b, respectively. As will be shown, such manner of connection makes possible readout of the digital information in a pattern which permits the use of a standard eight-level paper tape to record digital numbers of correspondingly higher values.

The output path of the first group of four AND-gates 190a-193a (which is in effect the information to be punched in the first level of the tape) is connected over a NOR-gate 220 to output conductor 211 and an input of an associated AND-gate 230 in the drive circuit 44. The outputs of each of the other groups of AND-gates B–F are connected over corresponding NOR-gates 221-225 and output conductors 212-216 to associated AND gates in the drive circuit 44. The second input to each of the AND gates, such as 230, in drive circuit 44 are connected over conductor 237 to the output of a one-shot multivibrator circuit 238 which as will be shown is periodically controlled by timer pulses over conductor 239 output from timer circuit 31 in timer 22.

A parity generator 52 has six conductors connected to the output conductors 211-216 of the gating circuit and a seventh conductor connected to the clock conductor 43 output from timer circuit 31. Parity bit generator 52 which may be of the type SN74180N commercially available from Texas Instruments, is operative to provide a parity pulse whenever the total number of pulses on the conductors 211-216 and 43 has an even number of "1" bits, which pulse is fed over conductor 218 to an associated AND-gate 229 in drive circuit 44 over conductors 43 and gate 236 by the timer circuit 31.

In each readout (two for each memory circuit—or a total of four in a two-channel system for each fifteen minute interval) pulses are transmitted over the ones of the eight paths 240'-247' which were marked by the memory circuit via gating circuit 42. As will be shown, transmission of the markings occurs only when a clock pulse is provided over conductor 237 to the gates 230-236 in drive circuit 44 by the one shot multivibrator 238. The pulses thus provided on paths 240-247 are fed to individual power amplifiers, indicated generally by block 48', and, as amplified, are fed to connected ones of the coils of the punch solenoids 46.

The parity solenoid is identified by the letter P, the binary marking solenoids by the letters I1–I32 (which also serve as solenoid I64–I2048) and the time marking solenoid is identified by the letter T. The manner in which a typical readout of a memory is effected to operate the solenoids is now set forth in detail.

READOUT OF COUNT IN MEMORY CIRCUITS 30,

41 TO ENABLE SELECTED ZONES OF SOLENOIDS 46

As noted above, the 15-minute intervals in the system are basically provided by a motor drive set 53 (FIG. 5) which includes a motor 52 and suitable gear reduction units 56, etc., connected to operate a main crankshaft 48 at 16 r.p.h., whereby the shaft 48 will make four complete revolutions in each 15-minute timing interval. It will be recalled that during each timing interval in the system (15-minute intervals in the present embodiment) a count of the digital pulses representative of the information to be placed on the tape as received over the input circuits Y1, Z1; Y2, Z2 for the channels, such as 1 and 2, are stored in the counting circuits 20, 40. At the start of the next 15-minute interval and closure of timer contacts 242, the flip-flop 34 in timer circuit 31 provides an output signal over conductor 24 to reset circuit 26, and reset circuit 26 is effective as described heretofore to provide a pulse over conductor 28 to effect gating of the information from the counting circuits 20 and 40 to the memory circuits 30 and 41. Reset circuit 26 in the manner described heretofore thereafter applies a pulse over conductor 27 to reset the counting circuits 20, 40. During the period of readout and reset, a signal from flip-flop L1 cuts off transistor 168 to prevent the loss of an input pulse during such period. At approximately 39° of rotation contacts 241, 243 are closed to effect solenoid firing and punching of the tape with the information provided by the memories. Since the shaft 48 operates at 16 r.p.m. in a two-channel system, movable contact 241 will engage contacts 242 and contacts 243 four times in each 15-minute interval.

Flip-flop circuit 34 is comprised of two flip-flop stages and associated gating which are operable to four different states to provide an output over each of the four conductors 43, 45, 47, 49 at correspondingly different counts. More specifically, at approximately 8° of revolution of shaft 48, timer contact 241 is moved into engagement with contact 242 and ground to the timer circuit 31 operates the flip-flop circuit 34 to the first state to provide a potential signal over conductor 43 ($64^1$) to the gating circuit 42. The potential signal remains on conductor 43 until the shaft 48 completes the revolution and advances to 8° in its next cycle. (The time interval of the potential pulse A is therefore approximately 3¾ minutes). In the next three successive revolutions of shaft 48 pulse signals B, C, D, of like length appear respectively on conductors 45, 47, 49 ($64^0$, $64^1$, $64^0$). Four revolutions of shaft 48 which measures a 15-minute interval will therefore provide four successive pulses A, B, C, D on conductors 43, 45, 47, 49 of approximately 3¾ minutes each.

Assuming the system is being set into operation for the first time, there will be no pulses stored in the memory circuits 30 and 41, and the readout pulses A–D generated by the timer circuit during the first timing interval will be without functional effect. As the first timing interval is completed, and as the main shaft 48 initiates the first of its four cycles in the second 15-minute timing interval, pulse A, as generated at 8° of the cycle, controls reset circuit 26 to provide a pulse over conductor 28 to the memory circuits 30, 41 to control same to transfer the counts which appear at the output side of counting circuits 20 and 40 into the memory circuits 30 and 41 respectively, and to thereafter effect reset of the counters 20, 40 in the manner described heretofore, Additionally pulse A over conductor 43 to the second gate in each of the six groups of gates A–F in gating circuit 42 (FIG. 4) (i.e., gate 191a in the first group, gate 191e in the second group, etc.) causes the count information on the conductor group 185b (64, 128 . . . 2,048) to appear over the NOR-gate 220–226 and conductors 211–216 to one input respectively of gates 230–236 in the drive circuit 44.

It will be recalled that in the example described in FIG. 2, a count of 1,179 was assumed to have been accumulated by the counting circuit 20 in Channel 1 in the first 15-minute interval. Accordingly, conductors 1, 2, 8, 16 of group 185a, and conductors 128 and 1024 of the group 185b will be marked with a logic "1" signal. Since pulse A has a duration of 3¾ minutes and is connected to the gates, such as 191a–191e, the markings on the conductors of group 185b will be forwarded over NOR-gates 220–226 for such period and in the present example conductors 212 and 215 will have logic "1" markings thereon (i.e., conductors 128 and 1024 in group 185b were marked in the example).

In addition, the potential signal A output from timer circuit 31 (FIG. 3) over conductor 43 is also fed to gate 236 in drive circuit 44 (FIG. 4) for the purpose of marking the beginning of a timing interval on the tape.

At approximately 39° of rotation of crankshaft 48 (see FIG. 7g) contacts 241, 242 (FIG. 3) are opened, and contacts 241, 243 close to cause circuit 245 to generate pulse A', which over conductor 239 enables one-shot multivibrator 238 to provide an enabling pulse to the second input on each AND- circuit 229–236 in the output drive circuit 44 to thereby extend the markings on conductors 211–217, 43, over the power amplifiers 48' to the solenoid coils T, $I_1$–$I_{32}$, P. The conductors which are marked with logic 1 (conductors 213, 215 in the present example) will effect energization of the connected ones of the solenoid coils (i.e., I2, I16 in the present example). Contacts 241, 243 remain closed until approximately 8° of rotation of the timer shaft in its next cycle at which time potential over conductor 24 effects operation of the flip-flops in circuit 34 to generate pulse B and transfer of the markings on conductor group 185a to the drive circuit 44 in the same manner. In the next two rotations of shaft 48 the markings on conductor group 186a, 186b, are transferred to the punch solenoid 46 in like manner by pulses C and D on conductors 47, 49 (FIG. 3).

As will be shown, operation of solenoids I2, I16 as the result of the markings on conductor group 185b effects operation of associated ones of the eight interpose pins in interpose mechanism 84 to prepare the punches 85 for the second and fifth tape levels for operation at such time as the main timer shaft 48 rotates to approximately 157° of its travel (FIG. 7c). At such time, the ones of the punches 85 (the second and fifth in the present example), which have been prepared by the operated punch solenoids I2, I16 are moved downwardly to initiate punching of holes in the corresponding tape levels (the second and fifth levels in the example of FIG. 2) in a manner more fully described hereinafter. During the last part of the cycle of shaft 48 (219°–339°), the operated ones of the interpose members are reset for use in a subsequent cycle.

As the main shaft 48 starts its second revolution, the tape advance mechanism 86 is driven by shaft 48 to advance the tape to a position which will accommodate a second vertical row of punch holes which represent the count on the first six conductors 185a output from memory 30. As the timer shaft 48 advances to approximately 8° of the second revolution, contacts 242, 243 close, and circuit 34 provides pulse B over conductor 45 to enable the first gates 190a, 190b, etc., in each of the six gate groups A–F to forward the markings on the six conductors of group 185a over the NOR-circuits 220–225, and conductors 211, 216 to output drive circuit 230. At such time as the main timer shaft 48 advances to approximately 39°, the pulse B' over conductor 239 to the one-shot multivibrator 238 results in a signal over conductor 237 to the gates 229–236 in drive circuit 44 to effect passage of the logic "1" signals on the ones of the conductors which were so marked to power amplifier circuit 48' to operate the corresponding ones of the punch solenoids 46. In the present example shown in FIG. 2, the memory 30 marks conductors 1, 2, 8, 16 of group 185a and solenoids I1, I2, I8 and I16 will therefore be energized.

Additionally, since the total number of punches in the vertical column which represent the sum 27 is four (an even number), parity bit generator 45 will detect the "even" condition, and will provide logic 1 over conductor 217 to the associated gate 229 in drive circuit 44, whereby parity coil P in the punch solenoids 46 will be energized with the solenoids I1, I2, I8 and I16 to prepare for the punching of a parity code hole in the second vertical column.

In a similar manner during the third and fourth revolutions of the second timing interval, the count accumulated in the memory 41 during the first timing interval will be transferred to the punch solenoids 46 to effect punching of the next two vertical columns of holes in the paper tape. Briefly, pulse C which is generated during the third revolution of shaft 48 effects transfer of the information on the conductor group 186b to the drive circuit 44, and pulse D which is generated in the fourth revolution effects transfer of the information on conductor 186a to the drive circuit 44. Pulses C', D' effect transfer of the information from drive circuit 44 to the solenoids 46 in the manner of pulses A', B'.

TAPE PUNCHING AND ADVANCE MECHANISM

As described above, mechanical drive system 53 (FIG. 5) controls rotation of the main crankshaft 48 at a 16 r.p.m. rate to operate contact 240–244 (FIG. 3) in the provision of control pulses which prepare the punch solenoids 46 (FIG. 4) for operation in the punching of the paper tape member (to be described), and is further operative to drive the tape advance mechanism 86 (FIG. 5) in a synchronous manner so that the successive columns of holes will appear at successive positions on the tape. The shaft 48 is additionally operative in each cycle to drive the ones of the punches 85 which are associated with the solenoids 46 which have been energized into engagement with and through the tape 89 and to thereafter reset the interpose mechanism 84 (and thereby punches 85) for use in a subsequent punching operation. The tape advance mechanism 86 as driven by the shaft 48 in turn drives the takeup drive 88 on the cassette via a mechanical link 87.

With reference to FIGS. 6a-6d, the punch and interpose mechanism 84, 85, used in the punching of the tape 89 under control of the timer shaft 48 is set forth thereat. As there shown, a solenoid coil which may be, for example, coil I, (FIG. 4) is shown fastened with a U-shaped member 246 which is located within a housing member 248 which is supported on the frame member 249 of the unit. A solenoid clapper 250 having a hook or projection 251 at one end thereof is pivotally mounted at its other end on the upper end of one arm of bracket 246. Spring member 247 normally biases clapper 250 about its pivot point to urge the projection 251 into the path of one end of a cylindrical shoulder 252 which is fixedly attached to a plunger or shaft 254. The shaft 254 is supported at one end by suitable bearing surfaces 253 located in support member 249, and has the tip portion of its other end located in a transfer guide 264 which is in turn attached to one wall of the housing 248. A spring 258 on shaft 254 is located between one end of cylinder should 252 and the inner surface of support member 249.

A cocking cam 256 on the main shaft 48 is operative at approximately 219° of its cycle to urge a circular cam 255' attached to one end of cocking lever 258 to rotate the lever 258 about a pivot 257 and thereby urge the upper end 259 of the cocking lever 258 outwardly or to the right as shown in FIG. 6a. The upper end 259 of cocking lever 258 in such movement engages a second cylindrical member 260 on the rearward end of shaft 254 and in its movement urges shaft 254 laterally to permit spring 247 to urge the hook 250 on clapper 250 into the path of the first cylindrical member 252 on shaft 254, whereby the shaft 254 is moved to and held in the cocked position. The cocking cam 256 advances beyond the cocking position shown in FIG. 6c as shaft 48 continues to rotate.

Shaft 254 at its opposite end is attached to a transfer spring 262 which is slidably mounted in a bore 263 located in a transfer guide 264. An interpose pin 266 connected to the opposite or outer end of transfer spring 262 is located with the bore 263 whenever shaft 254 is in the cocked position (see FIG. 6a).

An eccentric cam 266a mounted on the main shaft 48 has its outer surface located in sliding engagement with the inner surface of a receiving bore on a bellcrank 268, and its rotation with the shaft 48 cyclically drives bellcrank 268 in a predetermined pattern. The lower end of bellcrank 268 is connected at pivot 270 to the approximate center of a transfer bar 267. A projection 267' on one end of transfer bar 265 is located with its upper surface in contact with the lower surface of a projecting lip 264' on transfer guide 264. The opposite end of the transfer bar 267 is pivotally mounted in a U-shaped receiving section or channel 269 of a punch holder 271 which has a punch 272 depending downwardly from and being fixedly located in the lower end thereof. Guide holes 273 in guide plate 274 and guide hole 275 in stripper plate 276 are aligned with the punch 272 and provide support against the lateral displacement of the pivot as reciprocal vertical movement is imparted thereto by the interpose mechanism. The guide plate 274 and stripper plate 276 are separated by a suitable spacer member 277. A die plate 280 provides a support surface for the tape 89 which is moved laterally as shown in FIG. 6a beneath the punch 272. An aperture 281 in the die plate is aligned with the guide holes to 273, 275 to receive the punch 272 as urged downwardly by the transfer bar 265. Stop members 282 limit vertical movement of the punch holders, such as illustrated holder 271.

It will be apparent that the tape as moved from left to right in the illustration of FIG. 6a, and the punches, such as 272, (i.e., the punch in FIG. 6a is a side view of only one of the eight punches which in such view are located in a row behind the illustrated punch) are aligned in a row across the tape path so that operation of the selected ones of the punches will provide a vertical column or row of punches therein. Successive vertical columns of holes represent successive information bits (see FIG. 2).

Assuming that the solenoid I1 shown in FIGS. 6a–6d is not energized in a particular readout, solenoid clapper 250 will hold the shaft 254 in the cocked position during such readout. Main shaft 48 and eccentric cam 266a in its rotation from the position shown in FIG. 6a to the position shown in FIG. 6b (approximately 50° in the shaft cycle) will move the lower end of the bellcrank 268 downwardly and in its continued rotation (approximately 110° in FIG. 6c) will cause the transfer bar 267 to teeter-totter about pivot 270 and to operate to the position shown by the dotted lines in FIG. 6c, with the punch holder 271 moved upwardly until limited by stop 282.

More specifically, as shown in FIG. 6a, the projection 267' on the transfer bar 267 is in engagement with the lip 264' on the transfer guide 264. As the main timer shaft 48 rotates in the clockwise direction, the projection 267' on the end of transfer bar 267 will move downwardly (i.e., the interpose pin 266 is housed in bore 263 of guide 264 and movement of the transfer bar 267 is uninhibited by such pin) as shown by dotted lines in FIGS. 6b and 6c. The transfer bar 267 in turn urges the punch holder member 270 upwardly until restricted by stop member 282. As the rotation continues, the projection end of transfer bar 267 is moved back into engagement with lip 264' on transfer guide 264, and the opposite end of transfer bar 267 returns the punch holder member 272 to its starting position (FIG. 6a).

It will be apparent therefrom that with solenoid I1 not energized, shaft 254 remains in the cocked position and shaft 48 will rotate without effecting movement of the punch 272 in a tape-punching operation.

Assuming now that the solenoid coil I1 is energized, clapper 250 will be drawn toward coil I1 and as shown in FIG. 6b, the hook end of clapper 250 is withdrawn from the path of the cylindrical member 252 on shaft 254, and the force of spring 255 will urge shaft 254 into the transfer guide 264 to displace the interpose pin 266 out of the protective bore 263 in the transfer guide 264 and into a blocking position for the projection 267' on the transfer bar 267 to arrest downward movement of the projection end of transfer bar 267. The upper lip 264' on the transfer guide 264 and the interpose pin 266 thus trap the projection end of transfer bar 265 against downward movement (FIG. 6b).

It will be recalled that firing of the selected ones of the solenoids, such as illustrated solenoid I1, occurs at approximately 8° of revolution of the main shaft 48 (see FIG. 7g). As the timer shaft 48 continues in its movement to approximately 120° of rotation (FIG. 7c) the eccentric cam 266a (solid lines—FIG. 6c) moves the bellcrank 268 downwardly and with the projection 267' on transfer bar 267 trapped between lip 264' and interpose pin 266, the transfer bar 267 rotates about pivot 270 to displace the opposite end of the transfer bar 267 downwardly, which in its engagement with the receiving section 269 of the punch holder 271 urges member 271 and its associated punch 272 downwardly through guide holes 273, 275 into engagement with and through the tape member 89 and into die plate 280 to provide a hole in the tape 89.

As the rotation of the main timer shaft 48 continues to approximately 219° (FIG. 7c) the eccentric surface of cocking cam 256 as shown in FIG. 6d, will initiate a cocking action by cocking lever 258 and by the time the main timer shaft reachs 337° as shown in FIG. 6a, the shaft 254 will be cocked and interpose pin 266 will be withdrawn into the bore 263 in transfer guide 264 (FIG. 6a).

TIMING CYCLE

With reference to FIG. 7, the mechanical and electrical operations cyclically effected by the main shaft 48 in each rotation is graphically shown thereat. As shown in FIG. 7g, the timer shaft 48 effects closure of electrical contacts 242 (FIG. 3) at approximately 8° of rotation which contacts as described above effect transfer of the count in counting circuits, such as 20, 40, into the associated memories, such as 30, 41 and reset of the counter circuits to initiate a further count accumulation.

At approximately 39° of each rotation, contacts 242 are opened and contacts 243 are closed to provide a pulse, such as A', B', C', D' to enable the ones of the solenoids 46 which represent the count to be punched on the tape. In the first revolution of the main timer shaft in the 15-minute period, pulse A' causes the count represented by the markings on conductors 185b to enable corresponding ones of the punch solenoids 46.

With the reference to graphs 7b, 7c, it will be apparent that at the time of solenoid enablement by the electrical circuits, the punch eccentrics 266a (FIG. 6a) for the punches are at the high point of travel (approximately 39°) and in the continued rotation of the main shaft 48, the ones of the punches which have their associated coils energized by the electrical system will be urged downwardly in the direction of the tape 89 at approximately 120° of the main timer shaft cycle 48. Actual passage of the punches 272 through tape 89 occurs at approximately 180°.

As the shaft 48 advances to approximately 219° of revolution, the cocking mechanism (cam 256) for the interpose mechanisms initiates operation of the cocking levers 258 (FIG. 7e) to withdraw the ones of the interpose pins 266 which have been fired. Complete reset of the interpose mechanism is effected by the time the shaft reaches 339° of rotation.

As shown in FIG. 7d, the tape takeup reel 88 in the cassette is continuously driven by a shaft 87 which in turn is driven by the tape advance mechanism 86 (to be described).

Four such cycles of the main shaft are required to effect the punching of four columns of holes in the tape 89, the four columns in turn representing the total count accumulating in Channels 1 and 2 in the previous 15-minute interval.

TAPE ADVANCE MECHANISM

Figure 10:
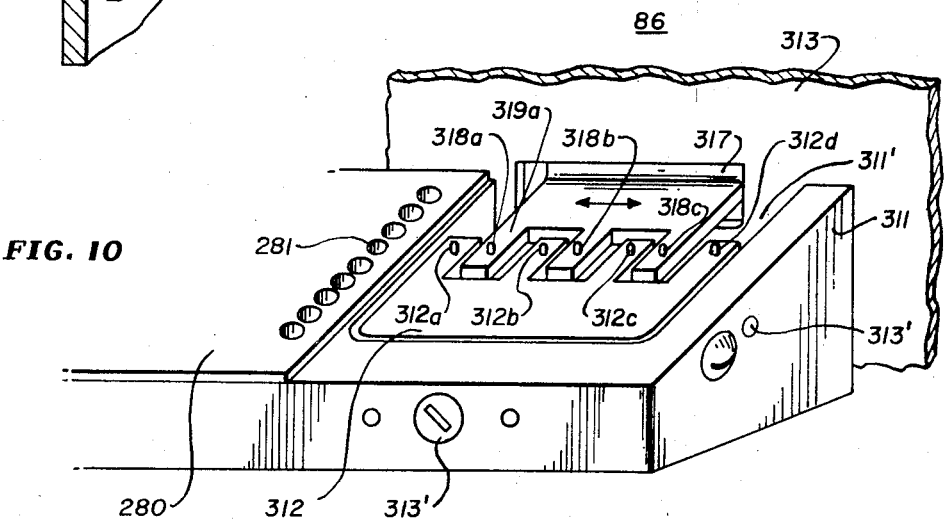

It will be apparent that as each vertical column of holes is punched in the tape 89, it is necessary to advance the tape to bring a further tape area into position for punchout of the information stored in the memory circuits. Advance of the tape 89 is controlled by a tape advance mechanism 86 shown in FIGS. 8a-8d, 9, 10, 11a-11c. With reference first to FIG. 10, the tape advance mechanism 86 includes a fixed block 311 mounted on main plate 313 (FIGS. 9 and 10) which block has a U-shaped opening 311' for locating an adjustable block 312 which has four horizontally projecting fingers, each of which locates a fixed vertical pin 312-312d respectively which are spaced to cooperate with the guide holes 314 which extend along the drive hole centerline of the tape 89 (see FIG. 2). The fixed block 313 locates adjusting screws 313' for the purpose of effecting lateral movement of the adjustable block 312 along both the X and Y axes, whereby the fixed pins 312a may be properly aligned in a horizontal row with the guide holes 314 in the tape, and also with guide hole 281 in die plate 280 which is located on the upper surface of fixed pin block 313. The distance between the guide hole 281 and the first fixed pin 312a (and the distance between successive fixed pins 312a, 312b, etc.) is 0.300 inches. The distance between successive holes 314 on the tape 89 is 0.100 inches.

The cutout sections in the adjustable block 313 located between the horizontal finger in adjustable block 312 receive the three horizontally projecting finger-carrying members 319a-319c of the horizontally extending portion of an L-shaped bracket member 317 (FIGS. 8a-8d and 10) which has a vertical portion secured to a cam follower plate 323 by suitable fastening means 322. The fastening means 322 which are used as bracket-adjusting eccentrics, secure the bracket 317 to the cam follower plate 323 so that fingers 319a-319c project into the cutout area on adjustable block 312 with the fingers 318a, b, c in horizontal alignment with the row of fixed fingers 312a, b, c, d on block 312 when the cam follower plate 323 is mounted rearwardly of and on the support plate 313.

The cam follower plate 323 locates a fixed post 324 which is received by a hole on a fixed support member (not shown), and a washer and retainer ring assembly 325 on the post 324 spring load the cam follower plate 323 against nylon bearing screws (not shown) which are set into the support plate 313. Motion of the cam follower plate 323 and the tape advancing fingers 318a-c is effected by a cam 328 (FIG. 11a) which is fixedly mounted on shaft 48 with its outer surfaces in engagement with the inner surfaces of aperture 327 in the cam follower plate 323. As will be shown rotation of shaft 48 and cam 328 drives the cam follower plate 323, attached bracket 317 and pins 318a-313c in a rectangular pattern to effect advancement of the tape 89.

More specifically, the cam member 328 (as further shown in FIG. 11a) has a first area having an outer edge $a$ defined by a radius of $X+(M/2)$ which extends approximately 112° to the right and left of a vertical reference line (56°, 26', 51" to either side), a second area having an outer edge $b$ defined by a radius of $2X$ with edge $b$ extends clockwise from edge $a$ approximately 67° to approximately 157°, and a third area which has an outer edge $c$ which extends from edge $b$ at 157° clockwise to 203°, which outer edge is defined by a radius of $X-(M/2)$, and a fourth area which has an outer edge $d$ defined by the radius $2X_1$ which extends from edge $a$ at approximately 203° clockwise to 304°. The radii in one embodiment were 0.3R, 0.5R, 0.2R, 0.5R respectively. The follower hole 327 (FIG. 11b) has a height and width of $2X$ and corners having a radius of $(2/X)$ R.

The manner in which the surfaces of the cam 328 engage the sides of the follower hole 327 located in the follower plate 323 as the shaft 48 rotates through a cycle as shown in FIG. 11, and the manner in which the follower plate 323 operates the tape-advancing finger 319a, b, c, through a rectangular pattern is shown by the sequence illustrations of FIGS. 8a-8d.

Briefly, as shown in FIG. 11c, between 0° and 67° of rotation of the main shaft 48, the contacting edges of cam 328 moves the follower plate 323 to the right; between 67° and 90° the follower 323 is idle; between 90° and 157° the follower 323 is moved downwardly; between 157° and 180° the follower 323 is idle, and between 180° and 247° the follower 323 is moved to the left; from 247° to 270° the follower 323 is idle, and from 270° to 293° the follower 323 is moved vertically to its initial start position; and from 293° to 360° the follower 323 is idle. Thus, in each cycle of the timer shaft 48, the follower 323 is moved through a complete rectangular pattern.

With reference once more to FIGS. 8a-8d the manner in which the tape is advanced by the movable fingers 318a, b, c, will now be apparent. At the start of each rotation of shaft 48 (0°) the movable fingers 318a, b, c will be in the left-hand or start position shown in FIG. 8b (the tape raised out of engagement with fixed fingers 312a, b, c).

As the main timer shaft 48 moves from 0° of rotation to 67°, the cam 328 moves follower 323 laterally to the right (the second position—FIG. 11c) and as shown in FIG. 8b, the attached finger-carrying bracket 317 moves fingers 318a, b, c to the right which, being engaged with the median tape holes on the tape 89 cause the tape 89 to be moved to the right as viewed in FIG. 8b.

During rotation of the cam 328 between 67° and 90°, the follower 323 is idle (the third showing of FIG. 11c). As the cam rotates from 90° to 157° (the fourth showing in FIG. 11c) the follower 323 is moved downwardly and the movable bracket 317 and fingers 318a-c on the movable bracket 317 are moved downwardly and out of engagement with the median tape holes (FIG. 8c). The guide holes on tape 89 have now been moved to the right one position. A plastic cover 330 provides downward pressure on tape 89 during the lateral movement of the tape to maintain engagement of the tape with the tape advancing fingers 318a–c.

During the movement of the cam through the angles of 157°–180° the follower is idle (the fifth showing of FIG. 11c). As the cam 328 advances from 180° to 247° (the sixth showing of FIG. 11c) the follower 323, bracket 317 and the movable fingers 318a, b, c are moved to the left (FIG. 8d) and to a position immediately below the ones of the median holes in the tape which are adjacent to the tape holes engaged by the fixed fingers 318a, b, c.

With continued movement of the cam from 247° to 270° (the seventh position in FIG. 11c) no further movement of the bracket 317 or tape 89 is effected. As the cam 328 is moved from the angle of 270° to 339° (the eighth position in FIG. 11c) the movable bracket 317 and fingers 318a–c are moved upwardly (FIG. 8a) to cause the teeth to engage the median tape holes which are aligned therewith and to raise the tape 89 out of engagement with the fixed fingers 312a–d preparatory to a further tape advancing movement.

OTHER APPLICATIONS

While there has been described in the foregoing embodiment a novel demand recorder for providing a punched tape record of electrical demand for one or more distribution points, it will be apparent that the novel device has utility in any application in which a pulse or digital input is provided as representative of an event or parameter which is to be recorded. A few other typical applications might include measurement of gas flow with a pulsing mechanism in the gas meter, the measurement of a liquid line by use of a rotating member which indicates level by position, the measurement of highway traffic with a pneumatic road tube or electronic vehicle detector, and many others which will be apparent to those skilled in the art.

We claim:

1. In a recorder device for making a tape record of digital pulses which represent changing information, an input stage over which said digital pulses are received, counting means for counting the impulses input over said input stage including an output circuit for providing an accumulated count in a binary code in which a plurality of n bit positions are used to represent said accumulated count, each position having a different weighted value, memory means for registering the binary count information received from said counting means, and recording means for providing a record of each of said accumulated counts, transfer means for periodically transferring said accumulated count information from said memory means to said recording means including a first gating means connected to transfer a first plurality of the bits of said accumulated count to said recording means, each of the said first plurality being of a different weight, and a second gating means connected to transfer a second plurality of bits of said accumulated count to said recording means, each of the bits of said second plurality being of a different weight than the bits of said first plurality, recording media for said recorder means, and advance means in said recording means for controlling movement of said recording media to register said first and second plurality of bits in two different spatial positions on said recording media, whereby said accumulated count is represented on said recording media by the sum of the weighted bit positions of said first and second plurality of bits at each position times a fixed multiplier, a different multiplier being used for the bits at each position.

2. A system as set forth in claim 1 in which said recording media comprises a multilevel paper tape and said recording means further includes punch means for providing punch holes in said multilevel tape, and which includes means responsive to said first and second plurality of bits to operate said punch means to provide a first and second vertical column of punch holes on said multilevel tape at said first and second spatial positions respectively.

3. A system as set forth in claim 1 which includes means for enabling said first and second gating means to effect transfer of said first and second plurality of bits to said recording means at different time periods.

4. A system as set forth in claim 1 in which said memory means has at least 12 output conductors for providing a 12-bit output in the binary code, and in which said first and second gating means consist of six groups of gates, each of which groups includes at least two gates, and timer means for at times controlling one gate in each group of six to transfer the first plurality of six bits to said recording means, and at other times controlling the other gate in each group of six to transfer the second plurality of six bits.

5. A system as set forth in claim 1 in which said recording means comprises a multilevel paper tape, and a plurality of punch members, each of which punch members punches information on a different level of said tape, and which includes solenoid means responsive to the bits in each of said first and second plurality of bits for selectively controlling operation of corresponding ones of said punch members.

6. A system as set forth in claim 1 in which said recording means includes a punch member for each bit in said first plurality of bits, an interpose member for each punch member, solenoid means for setting the ones of the interpose members for which a corresponding bit of said plurality has a predetermined value, and means for thereafter operating the ones of the punch members which are associated with the interpose members which are set by said solenoid means.

7. A system as set forth in claim 6 in which said last means includes a rotating shaft member, means controlled by said shaft member to operate the punch members prepared by the set ones of said interpose members, and reset means controlled by said shaft member to reset the operated ones of said interpose members, and which includes further means for transferring the accumulated count from said counting means to said memory means, timer means operated by said rotating shaft to enable said further means only once every predetermined number of cycles of said shaft member, and additional means controlled by said timer means for enabling said first and second gating means respectively in two successive revolutions of said shaft member.

8. A system as set forth in claim 1 in which said input stage includes means for providing digital pulses representative of the number of turns of a rotating shaft on a meter device.

9. In a data recorder device for making a tape record of digital pulses which represent changing information, an input stage over which said digital pulses are received, counting means for counting the impulses input over said input stage including an output circuit for providing an accumulated count represented by a plurality of bits, memory means for registering the count information received from said counting means, and recording means for providing a record of each of said accumulated counts on a multilevel tape including a plurality of punch members, an interpose member for each punch member, each of which interpose members is selectively operable to a set position, actuator means responsive to at least a portion of the bit information which represents a single accumulated count to selectively operate indicated ones of said interpose members to said set position to thereby represent the information provided by such bits, and program means including means operable over an extended time period to slowly operate the punches associated with the set ones of said interpose members to provide a corresponding set of holes in the multilevel tape, transfer means for effecting instant gating of bit information from the memory means to said actuator means, and timer means for operating said transfer means to control transfer of different portions of the bits for said single accumulated count from said memory means to said actuator means at different predetermined time intervals separated by said time period.

10. In a system as set forth in claim 9 in which said program means comprises a slowly rotating shaft which operates said interpose members to effect the registration on said multilevel tape of the count accumulated over said extended time period, and said timer means comprise gate means controlled by said shaft for substantially instantaneously transferring one plurality of bits of an accumulated count to said actuator means at the start of each extended time period.

11. In a recorder device for making a tape record of digital pulses which represent changing information received over a relatively long time period, an input stage over which said digital pulses representing such information are received, counting means for counting the impulses received over said input stage including means for providing an accumulated count in a binary code in which a plurality of $n$ bit positions are used to represent the count, each position having a different weighted value, memory means for registering the binary information for each accumulated count received from said counting means, and recording means for providing a record of each of said accumulated counts comprising a plurality of punch members, interpose means for each punch member each of which is selectively operable to a locked set position for operating its associated punch member, solenoid means for selectively operating each interpose means to said set position, and gate means for momentarily applying at least certain of the bits of an accumulated count to said solenoid means to effect selective setting of the associated interpose members to a set position for a prolonged time interval to represent the bit information thus provided, and a relatively slow-moving rotating shaft for slowly controlling movement of the ones of the punch members controlled by the set ones of the interpose members to provide a coded pattern in an associated recording media.

12. A system as set forth in claim 11 which includes rotating shaft to advance said tape past said punches after each punching operation.

13. A system as set forth in claim 12 in which said tape advance mechanism comprises a cam on said rotating shaft, a cam follower having an aperture for receiving said cam, tape-engaging fingers connected by said cam follower, the surfaces of said eccentric cam being shaped to move said tape-engaging fingers in a rectangular pattern in each cycle of said actuating shaft including movement of said tape-engaging finger vertically into engagement with corresponding holes on the tape, lateral movement of said tape-engaging fingers to advance said tape, vertical downward movement of said tape-engaging fingers to move same out of engagement with the tape, reverse lateral movement of the tape-engaging fingers to a position below a different set of tape holes, and vertical movement upwardly to move the tape-engaging fingers into engagement with a different set of tape holes.

14. A system as set forth in claim 12 in which said tape advance mechanism includes a movable member which carries tape-advancing fingers and a fixed member which carries tape-positioning fingers, and means operated by said rotating shaft to move said movable member in rectangular pattern which moves the tape out of engagement with the fixed fingers, advances the tape and lowers the tape to bring the fixed fingers into registration with the tape holes.

15. A system as set forth in claim 11 which includes means enabled by said solenoid means as operated to prepare a member carried by said rotating shaft to operate its associated punch.

16. A system as set forth in claim 11 and which includes power input means for connecting power to said device, sensing means for detecting a predetermined drop in said input power, and means for controlling said recording means to enable said solenoid means in the marking of a code on said tape which includes a power outage.

17. A system as set forth in claim 16 in which said sensing means includes means for transferring said power input means to a battery source responsive to detection of said drop, and further means for detecting drop of said power from said battery source to a predetermined level.

18. In a recorder device for making a tape record of digital pulses which represent changing information, an input stage over which said digital pulses are received, counting means for counting the impulses input over said input stage including an output circuit for providing an accumulated count represented by a plurality of bits in a binary code in which a plurality of $n$ bit positions represent each accumulated count, each position having a different weighted value, memory means for registering the count information received from said counting means, recording means for providing a record of each of said accumulated counts on a multilevel paper tape including a plurality of punch members for providing a vertical column of punch hones in each recording operation, an interpose member for each punch member, each of which interpose members is selectively operable to a set position, actuator means for selectively operating said interpose members to said set position, transfer means for transferring bits from the memory means to enable said actuator means in the setting of indicated ones of said interpose member, program means including means operable over an extended time period to slowly operate the punches associated with the set ones of said interpose members to provide a corresponding set of holes in the multilevel tape, and means for controlling said transfer means to provide a first plurality of the bits for a single accumulated count to said actuator means at a first interval, and for transferring a second plurality of the bits for the same accumulated count to said actuator means at a later time interval, and tape advance means operable to advance said tape after said vertical column of holes has been punched thereon.

* * * * *

UNITED STATES PATENT OFFICE
CERTIFICATE OF CORRECTION

Patent No. 3,643,063          Dated February 15, 1972

Inventor(s) Norman F. Marsh and Karl W. Struck

It is certified that error appears in the above-identified patent and that said Letters Patent are hereby corrected as shown below:

Column 21, line 30, after "includes" insert -- tape advance mechanism driven by said --.

Signed and sealed this 19th day of September 1972.

(SEAL)
Attest:

EDWARD M. FLETCHER, JR.          ROBERT GOTTSCHALK
Attesting Officer          Commissioner of Patents